(12) United States Patent
Lin et al.

(10) Patent No.: US 10,400,072 B2
(45) Date of Patent: Sep. 3, 2019

(54) COMPOSITE PARTICLES FOR CURING EPOXY RESIN COMPOSITIONS AND CURABLE AND CURED EPOXY RESIN COMPOSITIONS PREPARED USING THE PARTICLES

(71) Applicant: 3M INNOVATIVE PROPERTIES COMPANY, St. Paul, MN (US)

(72) Inventors: Ying Lin, Woodbury, MN (US); Hassan Sahouani, Hastings, MN (US); Mary M. Caruso Dailey, Maplewood, MN (US); Luke E. Heinzen, Shoreview, MN (US); Michael A. Kropp, Cottage Grove, MN (US); Patricia M. Savu, Maplewood, MN (US); Jonathan W. Kemling, Woodbury, MN (US); Wayne S. Mahoney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/095,184

(22) PCT Filed: Apr. 24, 2017

(86) PCT No.: PCT/US2017/029046
§ 371 (c)(1),
(2) Date: Oct. 19, 2018

(87) PCT Pub. No.: WO2017/189388
PCT Pub. Date: Nov. 2, 2017

(65) Prior Publication Data
US 2019/0135991 A1 May 9, 2019

Related U.S. Application Data

(60) Provisional application No. 62/327,220, filed on Apr. 25, 2016.

(51) Int. Cl.
| | | |
|---|---|---|
| *C08J 3/24* | (2006.01) | |
| *C08L 33/16* | (2006.01) | |
| *C08J 3/12* | (2006.01) | |
| *C08K 9/10* | (2006.01) | |
| *C08G 59/40* | (2006.01) | |
| *C09D 133/16* | (2006.01) | |
| *C08J 9/36* | (2006.01) | |
| *C08L 33/10* | (2006.01) | |
| *C08L 63/00* | (2006.01) | |

(52) U.S. Cl.
CPC .............. *C08J 3/241* (2013.01); *C08G 59/40* (2013.01); *C08J 3/126* (2013.01); *C08J 9/365* (2013.01); *C08K 9/10* (2013.01); *C08L 33/10* (2013.01); *C08L 33/16* (2013.01); *C09D 133/16* (2013.01); *C08J 2333/14* (2013.01); *C08J 2333/16* (2013.01); *C08J 2363/00* (2013.01); *C08J 2433/10* (2013.01); *C08J 2433/16* (2013.01); *C08L 63/00* (2013.01); *C08L 2207/53* (2013.01)

(58) Field of Classification Search
CPC .................................. C08L 33/16; C08J 3/241
See application file for complete search history.

(56) References Cited

U.S. PATENT DOCUMENTS

| | | | |
|---|---|---|---|
| 3,018,264 A * | 1/1962 | Colclough, Jr. | ....... C08G 59/18 523/211 |
| 3,496,250 A | 2/1970 | Czerwinski | |
| 3,565,861 A | 2/1971 | White | |
| 4,503,161 A | 3/1985 | Korbel | |
| 4,503,211 A | 3/1985 | Robins | |
| 4,948,449 A | 8/1990 | Tarbutton | |
| 5,030,667 A | 7/1991 | Shimizu | |
| 5,316,774 A * | 5/1994 | Eury | ................... A61K 9/1635 424/426 |
| 5,593,759 A | 1/1997 | Vargas | |
| 5,629,380 A | 5/1997 | Baldwin | |
| 5,731,369 A | 3/1998 | Mahoney | |

(Continued)

FOREIGN PATENT DOCUMENTS

| | | |
|---|---|---|
| JP | 2011-012168 | 1/2011 |
| JP | 2013-071988 | 4/2013 |

(Continued)

OTHER PUBLICATIONS

Martin, "Hypercrosslinked organic polymer networks as potential adsorbents for pre-combustion $CO_2$ capture", J. Mater. Chem., 2011, vol. 21, pp. 5475-5483.

(Continued)

*Primary Examiner* — Vickey Nerangis
(74) *Attorney, Agent, or Firm* — Jean A. Lown

(57) ABSTRACT

Composite particles are provided that can be used to cure epoxy resins. More particularly, the composite particles have a porous polymeric core particle, a curing agent and/or a curing catalyst for an epoxy resin positioned within the porous polymeric core particle, and a fluoropolymer-containing coating layer around the porous polymeric core particle. Additionally, curable compositions are provided that are mixtures containing an epoxy resin and the composite particles. The epoxy resin typically does not react until the curable composition is heated causing the release of the curing agent and/or curing catalyst from the composite particle. Further, cured compositions formed from the curable composition are provided.

11 Claims, 3 Drawing Sheets

(56) References Cited

U.S. PATENT DOCUMENTS

| | | |
|---|---|---|
| 5,783,614 A | 7/1998 | Chen |
| 5,883,193 A | 3/1999 | Karim |
| 6,506,494 B2 | 1/2003 | Brandys |
| 6,664,354 B2 | 12/2003 | Savu |
| 6,894,105 B2 | 5/2005 | Parent |
| 7,173,778 B2 | 2/2007 | Jing |
| 7,645,514 B2 | 1/2010 | Watanabe |
| 7,923,133 B2 | 4/2011 | Kehren |
| 7,927,514 B2 | 4/2011 | Kondo |
| 8,044,117 B2 | 10/2011 | Matsushima |
| 8,176,981 B2 | 5/2012 | Savu |
| 9,067,395 B2 | 6/2015 | Plaut |
| 9,422,411 B2 | 8/2016 | Sahouani |
| 2005/0107494 A1 | 5/2005 | Matsushima |
| 2012/0010364 A1 | 1/2012 | Schwantes |
| 2013/0149531 A1 | 6/2013 | Kosal |
| 2016/0088836 A1 | 3/2016 | Sahouani |
| 2017/0369633 A1* | 12/2017 | Caruso Dailey ......... C08J 3/241 |

FOREIGN PATENT DOCUMENTS

| | | |
|---|---|---|
| KR | 100944067 | 2/2003 |
| WO | WO 2002/016517 | 2/2002 |
| WO | WO 2011/126702 | 10/2011 |
| WO | WO 2014/186328 | 11/2014 |
| WO | WO 2016/105997 | 6/2016 |

OTHER PUBLICATIONS

International Search Report for PCT International Application No. PCT/US2017/029046 dated Jul. 28, 2017, 5 pages.

* cited by examiner

COMPOSITE PARTICLES FOR CURING EPOXY RESIN COMPOSITIONS AND CURABLE AND CURED EPOXY RESIN COMPOSITIONS PREPARED USING THE PARTICLES

CROSS REFERENCE TO RELATED APPLICATIONS

This application is a national stage filing under 35 U.S.C. 371 of PCT/US2017/029046, filed Apr. 24, 2017, which claims the benefit of U.S. Provisional Application No. 62/327220, filed Apr. 25, 2016, the disclosure of which is incorporated by reference in its/their entirety herein.

FIELD

Composite particles containing a curing agent and/or curing catalyst for an epoxy resin, methods of making the composite particles, curable compositions containing the composite particles and an epoxy resin, cured compositions formed from the curable compositions, articles containing the cured composition, and methods of making the cured compositions are described.

BACKGROUND

Curable epoxy compositions are often provided as a two-part formulation in which the epoxy resin is separated from the curing agent until immediately prior to the formation of a cured composition. Once mixed, the curing agent and the epoxy resin react quickly at room or elevated temperatures. Such curable epoxy compositions tend to have good storage stability (such as one year or more) but need to be used soon after the part containing the epoxy resin is mixed with the part containing the curing agent. Further, the two parts must be carefully metered together for mixing so the amount of the epoxy resin and curing agent are appropriate.

The two-part formulations can include various curing catalysts (e.g., accelerants) that can replace the curing agent or that can be used in combination with the curing agent. These compounds typically do not get consumed in the curing reaction but lower the activation barrier to polymerization of the epoxy resin with itself or with the curing agent. Typical curing catalysts include, for example, various imidazole compounds, urea compounds, tertiary amines, and Lewis acids.

Some one-part compositions are known in which a latent curing agent and/or latent curing catalyst is used. Although no mixing is required, the shelf-life of one-part systems typically is significantly reduced compared to two-part formulations. The latent curing agent and/or latent curing catalyst is often a blocked imidazole compound. Shelf-lives of 6 months or more can be achieved through the use of latent curing agents that are thermally activated to form the cured composition. The cure temperature is often limited by the melting point of the curing agent, which typically exceeds about150° C. or about 170° C. for conventional latent curing agents.

SUMMARY

Composite particles and methods of making composite particles are provided. More particularly, the composite particles have a porous polymeric core particle, a curing agent and/or a curing catalyst for an epoxy resin positioned within the porous polymeric core particle, and a fluoropolymer-containing coating layer around the porous polymeric core particle. Additionally, curable compositions are provided that are mixtures containing an epoxy resin and the composite particles. The curable composition reacts (i.e., polymerizes) when the curing agent and/or curing catalyst is released from the composite particle and reacts with the epoxy resin. Further, cured compositions formed from the curable composition and methods of forming the cured compositions are provided.

In a first aspect, a composite particle is provided. The composite particle contains (a) a porous polymeric core particle, (b) a curing agent and/or curing catalyst for an epoxy resin positioned within the porous polymeric core particle but not covalently bound to the porous polymeric core particle, and (c) a coating layer around the porous polymeric core particle, wherein the coating layer comprises a fluorinated polymer.

In a second aspect, a method of making a composite particle is provided. This method includes providing a porous polymeric core particle. The method further includes positioning a curing agent and/or curing catalyst within the porous polymeric core particles to form a loaded porous polymeric core particle in which the curing agent and/or curing catalyst is not covalently bonded to the porous polymeric core particle. The method still further includes providing a fluoropolymer-containing coating layer around the loaded porous polymeric core particle.

In a third aspect, a curable composition is provided. The curable composition contains (1) an epoxy resin and (2) a composite particle mixed with the epoxy resin. The composite particle contains (a) a porous polymeric core particle, (b) a curing agent and/or curing catalyst for the epoxy resin positioned within the porous polymeric core particle but not covalently bound to the porous polymeric core particle, and (c) a coating layer around the porous polymeric core particle, wherein the coating layer comprises a fluorinated polymer.

In a fourth aspect, a cured composition is provided. The cured composition is a reaction product (i.e., polymerized product) of the curable composition described above.

In a fifth aspect, an article is provided. The article contains a first substrate, a second substrate, and a cured composition positioned between the first substrate and the second substrate (i.e., the cured composition is adhered to both the first substrate and the second substrate). The cured composition is a reaction product (i.e., polymerized product) of the curable composition described above.

In a sixth aspect, a method of forming a cured composition is provided. The method includes providing a curable composition that is the same as described above, heating the curable composition to release the curing agent and/or curing catalyst from the composite particle, and curing the epoxy resin.

DETAILED DESCRIPTION

Figure 1A:
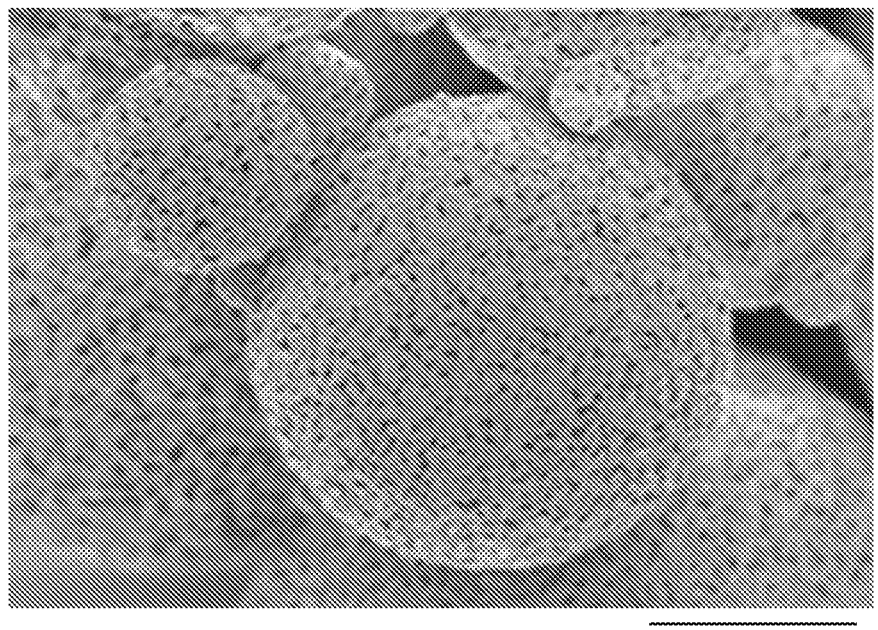
FIGS. 1A and 1B are scanning electron microscopy (SEM) images of example porous polymeric core particles that were formed according to Preparatory Example 1. These two SEM images have different magnifications.

Composite particles and methods of making the composite particles are provided. The composite particles contain a curing agent and/or curing catalyst for an epoxy resin. Additionally, curable compositions containing the composite particle and an epoxy resin, cured compositions formed from reaction (i.e., polymerization or curing) of the curable resin compositions, articles containing the cured compositions, and methods of making cured compositions are provided. The curable compositions are one-part formulations that contain a mixture of an epoxy resin and composite particles. The composite particles include a curing agent and/or a curing catalyst that can be released from the composite particles when the curable composition is heated above a certain temperature. Once released from the composite particle, the curing agent and/or curing catalyst can react with the epoxy resin resulting in the formation of a cured composition. The curable compositions can have excellent storage stability.

As used herein, the term "(meth)acryloyl" refers to a group of formula $CH_2=C(R^1)-(CO)-O-$ where $R^1$ is hydrogen or methyl. The term "(meth)acrylic acid" includes both acrylic acid and/or acrylic acid. The term "alkyl (meth)acrylate" includes both an alkyl acrylate and/or alkyl methacrylate.

As used herein, the terms "polymer", "polymeric", and "polymeric material" are used interchangeably to refer to a homopolymer, copolymer, terpolymer, or the like.

As used herein, the terms "fluoropolymer" and "fluorinated polymer" are used interchangeably to refer to a polymer having at least one fluorine atom. The fluorinated polymer is typically formed from a fluorinated monomer, which is a monomer having at least one fluorine atom.

The term "curing agent" refers to a compound that reacts with the epoxy resin. In many embodiments, the curing agent is a nitrogen-containing compound. The curing agent gets consumed in the reaction with the epoxy resin and becomes part of the cured composition. The curing agent can be used alone or in combination with a curing catalyst to cure the epoxy resin.

The term "curing catalyst" refers to a compound that lowers the activation barrier to polymerization of an epoxy resin, accelerates the reaction of a curing agent with the epoxy resin, initiates the polymerization of the epoxy resin, or initiates the reaction of the curing agent with the epoxy resin. In some embodiments, the curing catalyst typically does not get consumed in the reaction and it typically used in lower amounts than a curing agent. In other embodiments, the curing catalyst is attached to a first end of a cured product. A curing catalyst can be used alone or in combination with a curing agent to cure the epoxy resin.

As used herein, the term "and/or" means one or both. For example, the expression "curing agent and/or curing catalyst" refers to a curing agent only, to a curing catalyst only, or to both a curing agent and a curing catalyst. This expression is equivalent to the expression "curing agent, curing catalyst, or a mixture thereof."

The terms "curable composition" and "curable epoxy resin composition" are used interchangeably. Likewise, the term "cured composition" and "cured epoxy resin composition" are used interchangeably.

In one aspect, a composite particle is provided. The composite particle is used to store and then to deliver a curing agent and/or a curing catalyst in a curable composition that contains an epoxy resin. The composite particles contain 1) a porous polymeric core particle, 2) a curing agent and/or curing catalyst positioned within the porous polymeric core particle but not covalently bonded to the porous polymeric core particle, and 3) a fluoropolymer-containing coating layer around the porous polymeric core particle. The curing agent and/or curing catalyst can be released from the composite particle by diffusing out of the porous polymeric core particle through the coating layer when the curable composition is heated such as at a temperature above room temperature. The released curing agent and/or curing catalyst can then react with the epoxy resin resulting in the formation of a cured composition.

In another aspect, a method of making a composite particle is provided. This method includes providing a porous polymeric core particle. The method further includes positioning a curing agent and/or curing catalyst within the porous polymeric core particles to form a loaded porous polymeric core particle in which the curing agent and/or curing catalyst is not covalently bonded to the porous polymeric core particle. The method still further includes providing a fluoropolymer-containing coating layer around the loaded porous polymeric core particle.

The composite particles have a porous polymeric core particle. The polymeric core particle has pores (i.e., voids or free volume) on its outer surface and/or channels into the interior region. In at least some embodiments, the polymeric core particle is hollow inside. The terms "porous polymeric core particle" and "polymeric core particle" are used interchangeably.

A curing agent and/or curing catalyst is positioned (i.e., sorbed or loaded) within the porous polymeric core particle. Stated differently, the porous polymeric core particle is loaded (i.e., filled) with a curing agent and/or curing catalyst and the resulting material can be referred to interchangeably as a "loaded polymeric core particle" and "loaded porous polymeric core particle".

The terms "porous composite particle" and "composite particle" are used interchangeably and refer to the loaded polymeric core particle that is coated with a fluorinated polymer. Because the composite particles include the porous polymeric core particle, the composite particles themselves can be considered to be porous. The composite particle can be viewed as a capsule containing the curing agent and/or curing catalyst (i.e., the curing agent and/or curing catalyst is encapsulated within the porous polymeric core particle portion of the composite particle). The capsule includes a loaded polymeric core particle that is encapsulated with a fluoropolymer-containing coating layer.

Any suitable porous polymeric core particle can be used but the porous polymeric core particle is typically a crosslinked (meth)acrylate polymeric material. The term "(meth)acrylate polymeric material" refers to a polymeric material formed predominately from monomers having (meth)acryloyl groups as the polymerizable groups. At least 50 weight percent, at least 60 weight percent, at least 70 weight percent, at least 80 weight percent, at least 90 weight percent, at least 95 weight percent, at least 98 weight percent, at least 99 weight percent, or 100 weight percent of the monomers used to form the (meth)acrylate polymeric material have a polymerizable (meth)acryloyl group. In most embodiments, the crosslinked (meth)acrylate polymeric material is a polymerized product of a monomer composition comprising at least one monomer with a plurality (i.e., at least two) of (meth)acryloyl groups.

The porous polymeric core particle is typically formed from a reaction mixture that includes a first phase and a second phase dispersed (e.g., as droplets) in the first phase with the volume of the first phase being greater than a volume of the second phase. The first phase provides a non-polymerizable medium for suspending the second phase as droplets within the reaction mixture. The second phase droplets include both a monomer composition that can undergo polymerization and a porogen, which is poly(propylene glycol). The monomer composition in the second phase droplets typically includes one or more monomers having (meth)acryloyl groups.

In many embodiments, the porous polymeric core particle contains a polymerized product of a reaction mixture that includes i) a first phase and ii) a second phase dispersed (e.g., as droplets) in the first phase, wherein a volume of the first phase is greater than a volume of the second phase. The first phase is considered to be the continuous phase and typically does not include polymerizable compounds. The second phase often includes 1) a monomer composition containing one or more monomers having (meth)acryloyl groups and 2) poly(propylene glycol). In many embodiments, the monomer composition includes a first monomer of Formula (I)

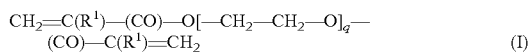  (I)

wherein q is an integer equal to at least 1 and $R^1$ is hydrogen or methyl. The poly(propylene glycol) typically has a weight average molecular weight of at least 500 Daltons (i.e., Da). The poly(propylene glycol) is removed from the polymerized product to provide the porous polymeric core particle.

The first phase of the reaction mixture typically includes either 1) water plus a polysaccharide dissolved in the water or 2) a surfactant plus a polyol compound of Formula (II).

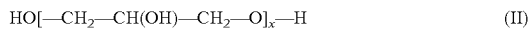  (II)

The variable x in Formula (II) is an integer equal to at least 1. The first phase is typically formulated to provide a suitable viscosity and volume for dispersion of the second phase as droplets within the first phase. If the viscosity of the first phase is too high, it can be difficult to provide the requisite shear to disperse the second phase. If the viscosity is too low, however, it can be difficult to suspend the second phase and/or to form polymeric core particles that are relatively uniform and well separated from each other.

In some embodiments, the first phase contains a mixture of water and a polysaccharide dissolved in the water. The polysaccharide can be, for example, water soluble starch or water soluble cellulose. Suitable water soluble starches and water soluble celluloses often have a viscosity in a range of 6 to 10 centipoise for a 2 weight percent solution in water at room temperature (i.e., 20° C. to 25° C.). Water soluble starches are typically prepared by partial acid hydrolysis of starch. Examples of water soluble starches include, for example, those that are commercially available under the trade designation LYCOAT from Roquette (Lestrem, France). Examples of water soluble celluloses include, but are not limited to, alkyl cellulose (e.g., methyl cellulose, ethyl cellulose, and ethyl methyl cellulose), hydroxylalkyl cellulose (e.g., hydroxymethyl cellulose, hydroxyethyl cellulose, hydroxypropyl cellulose, hydroxypropyl methyl cellulose, hydroxyethyl methyl cellulose, and hydroxyethyl ethyl cellulose), and carboxyalkyl cellulose (e.g., carboxymethyl cellulose).

In these embodiments, the first phase can contain up to 50 weight percent polysaccharide based on a total weight of the first phase. For example, the first phase can contain up to 40 weight percent, up to 30 weight percent, up to 25 weight percent, up to 20 weight percent, up to 15 weight percent, or up to 10 weight percent polysaccharide. The first phase typically includes at least 5 weight percent, at least 10 weight percent, or at least 15 weight percent polysaccharide. In some embodiments, the first phase contains 5 to 50 weight percent, 5 to 40 weight percent, 10 to 40 weight percent, 5 to 30 weight percent, 10 to 30 weight percent, 5 to 25 weight percent, 10 to 25 weight percent, or 15 to 25 weight percent polysaccharide based on a total weight of the first phase. The remainder of the first phase (i.e., the part of the first phase that is not a polysaccharide) is typically water or predominately water (e.g., at least 90 weight percent water, at least 95 weight percent water, at least 98 weight percent water, or 100 weight percent water). Any of the remainder that is not water can be an optional organic solvent that is miscible with water.

In some examples, the first phase contains 5 to 50 weight percent polysaccharide and 50 to 95 weight percent water, 5 to 40 weight percent polysaccharide and 60 to 95 weight percent water, 10 to 40 weight percent polysaccharide and 60 to 90 weight percent water, 5 to 30 weight percent polysaccharide and 70 to 95 weight percent water, 10 to 30 weight percent polysaccharide and 70 to 90 weight percent water, 5 to 25 weight percent polysaccharide and 75 to 95 weight percent water, 10 to 25 weight percent polysaccharide and 75 to 90 weight percent water, or 15 to 25 weight percent polysaccharide and 75 to 85 weight percent water. The various amounts are based on a total weight of the first phase. In many examples, the first phase includes only water and the dissolved polysaccharide (i.e., the weight percent polysaccharide plus the weight percent water is equal to 100 weight percent). In other examples, the only other material included in the first phase is an optional organic solvent.

If an optional organic solvent is used in the water/polysaccharide first phase, the organic solvent is selected to be miscible with water. Suitable organic solvents include, for example, an alcohol (e.g., methanol, ethanol, n-propanol, or isopropanol) or a polyol compound of Formula (II). The amount of the optional organic solvent is usually no greater than 10 weight percent, no greater than 5 weight percent, no greater than 2 weight percent, or no greater than 1 weight percent based on the total weight of the first phase. In some examples, the first phase is free or substantially free of the optional organic solvent. As used herein with reference to the optional organic solvent in the first phase, the term "substantially free" means that an organic solvent is not purposely added to the first phase but may be present as an impurity in one of the other components in the first phase. For example, the amount of the optional organic solvent is less than 1 weight percent, less than 0.5 weight percent, or less than 0.1 weight percent based on a total weight of the first phase.

In other embodiments, the first phase contains a mixture of the polyol compound of Formula (II) and a surfactant rather than a mixture of water and dissolved polysaccharide. For at least some second phase compositions, polymeric core particles having greater porosity (e.g., greater pore volume) can be obtained using a first phase that contains the polyol compound of Formula (II) and a surfactant.

Suitable polyol compounds of Formula (II) typically have a value of x that is in a range of 1 to 20, in a range of 1 to 16, in a range of 1 to 12, in a range of 1 to 10, in a range of 1 to 6, or in a range of 1 to 4. In many embodiments, the polyol compound of Formula (II) is glycerol where the variable x is equal to 1. Other example polyol compounds of Formula (II) are diglycerol (x is equal to 2), polyglycerol-3 (x is equal to 3), polyglycerol-4 (x is equal to 4), or polyglycerol-6 (x is equal to 6). The polyglycerols, which can be referred to as polyglycerins, are often a mixture of materials with varying molecular weight (i.e., materials with different values for x). Polyglycerols, diglycerol, and glycerol are commercially available, for example, from Solvay Chemical (Brussels, Belgium) and Wilshire Technologies (Princeton, N.J., USA).

A surfactant is typically used in combination with the polyol compound of Formula (II) in the first phase. The surfactant is usually a nonionic surfactant. The nonionic surfactant usually increases the porosity on the surface of the final polymeric core particles. The first phase is often free or substantially free of an ionic surfactant that could interfere with the polymerization reaction of the monomers within the second phase. As used herein with reference to the ionic (i.e., anionic or cationic) surfactant, the term "substantially free" means that no ionic surfactant is purposely added to the first phase but may be present as a trace impurity in one of the other components in the first phase. Any impurity is typically present in an amount no greater than 0.5 weight percent, no greater than 0.1 weight percent, or no greater than 0.05 weight percent based on a total weight of the first phase.

Any suitable nonionic surfactant can be used in the first phase. The nonionic surfactant is selected to be soluble in the polyol compound of Formula (II). The nonionic surfactant often has one or more hydroxyl groups or ether linkages (e.g., —$CH_2$—O—$CH_2$—) in one portion of the molecule that can hydrogen bond with other components of the reaction mixture. Suitable nonionic surfactants include, but are not limited to, alkyl glucosides, alkyl glucamides, alkyl polyglucosides, polyethylene glycol alkyl ethers, block copolymers of polyethylene glycol and polypropylene glycol, and polysorbates. Examples of suitable alkyl glucosides include, but are not limited to, octyl glucoside (also referred to as octyl-beta-D-glucopyranoside) and decyl glucoside (also referred to as decyl-beta-D-glucopyranoside). Examples of suitable alkyl glucamides include, but are not limited to, octanoyl-N-methylglucamide, nonanoyl-N-methylglucamide, and decanoyl-N-methylglucamide. These surfactants can be obtained, for example, from Sigma Aldrich (St. Louis, Mo., USA) or Spectrum Chemicals (New Brunswick, N.J., USA). Examples of suitable alkyl polyglucosides include, but are not limited to, those commercially available from Cognis Corporation (Cincinnati, Ohio, USA) under the trade designation APG (e.g., APG 325) and those commercially available from Dow Chemical (Midland, Mich., USA) under the trade designation TRITON (e.g., TRITON BG-10 and TRITON CG-110). Examples of polyethylene glycol alkyl ethers include, but are not limited to, those commercially available under the trade designation BRIJ (e.g., BRIJ 58 and BRIJ 98) from Sigma Aldrich (St. Louis, Mo., USA). Examples of block copolymers of polyethylene glycol and polypropylene glycol include, but are not limited to, those commercially available under the trade designation PLURONIC from BASF (Florham Park, N.J., USA). Examples of polysorbates include, but are not limited to, those commercially available under the trade designation TWEEN from Croda (Mill Hall, Pa., USA).

When the first phase contains a mixture of the polyol compound of Formula (II) and a surfactant (which is usually a nonionic surfactant), the surfactant can be present in any suitable amount. Often, the surfactant is present in an amount equal to at least 0.5 weight percent, at least 1 weight percent, or at least 2 weight percent based on a total weight of the first phase. The surfactant can be present in an amount up to 15 weight percent, up to 12 weight percent, or up to 10 weight percent based on a total weight of the first phase. For example, the surfactant is often present in the first phase in an amount in a range of 0.5 to 15 weight percent, in a range of 1 to 12 weight percent, in a range of 0.5 to 10 weight percent, or in a range of 1 to 10 weight percent based on the total weight of the first phase. The remainder of the first phase (the part of the first phase that is not a surfactant) is typically a polyol compound of Formula (II) or predominately the polyol compound of Formula (II) (e.g., at least 90 weight percent, at least 95 weight percent, at least 98 weight percent, or 100 weight percent is the polyol compound of Formula (II)). Any of the remainder that is not the polyol of Formula (II) can be water or an optional organic solvent that is miscible with the polyol.

In some examples, the first phase can contain 0.5 to 15 weight percent surfactant and 85 to 99.5 weight percent compound of Formula (II), 1 to 12 weight percent surfactant and 88 to 99 weight percent compound of Formula (II), 0.5 to 10 weight percent surfactant and 90 to 99.5 weight percent compound of Formula (II), or 1 to 10 weight percent surfactant and 90 to 99 weight percent compound of Formula (II). The various amounts are based on a total weight of the first phase. In many examples, the first phase contains only the surfactant and the compound of Formula (II) (i.e., the surfactant plus the weight percent polyol compound of Formula (II) is 100 weight percent of the first phase). In other examples, the only other material included in the first phase is optional organic solvent or optional water.

When the first phase contains the polyol compound of Formula (II) and a surfactant, an optional organic solvent that is miscible with the polyol compound of Formula (II) can be present in the reaction mixture. Suitable organic solvents include, for example, an alcohol such as methanol, ethanol, n-propanol, or isopropanol. Additionally, optional water can be added to the first phase. The amount of any optional water or organic solvent is selected so that the desired viscosity of the first phase can be achieved. The amount of the optional water or organic solvent is usually no greater than 10 weight percent, no greater than 5 weight percent, or no greater than 1 weight percent based on the total weight of the first phase. If higher amounts of water are included, the porosity of the resulting polymeric material may decrease. In some embodiments, the first phase is free or substantially free of the optional water or organic solvent. As used herein with reference to the optional water or organic solvent in the first phase, the term "substantially free" means that water or organic solvent is not purposely added to the first phase but may be present as an impurity in one of the other components in the first phase. For example, the amount of the optional water or organic solvent is less than 1 weight percent, less than 0.5 weight percent, or less than 0.1 weight percent based on a total weight of the first phase.

The reaction mixture includes a second phase dispersed in the first phase. The volume of the first phase is greater than the volume of the second phase. The volume of the first phase is sufficiently large compared to the volume of the second phase so that the second phase can be dispersed in the form of droplets within the first phase. Within each droplet, the monomer composition is polymerized to form a polymerized product. To form polymeric particles from the second phase, the volume ratio of the first phase to the second phase is typically at least 2:1. As the volume ratio increases (e.g., when the ratio is at least 3:1, at least 4:1, or at least 5:1), polymeric particles can be formed that have a relatively uniform size and shape. If the volume ratio is too large, however, the reaction efficiency is diminished (i.e., a smaller amount of polymeric core particles are produced). The volume ratio is generally no greater than 25:1, no greater than 20:1, no greater than 15:1, or no greater than 10:1.

The second phase includes both 1) a monomer composition containing one or more monomers having at least one (meth)acryloyl group and 2) a poly(propylene glycol) (PPG) having a weight average molecular weight of at least 500 Daltons. The weight average molecular weight of the PPG is often at least 1000 Daltons or at least 2000 Daltons. The weight average molecular weight can be up to 10,000 Daltons or even greater, up to 7,500 Daltons, or up to 5,000 Daltons. In some embodiments, weight average molecular weight is in a range of 500 to 10,000 Daltons, in a range of 1,000 to 10,000 Daltons, or in a range of 1,000 to 5,000 Daltons. The PPG functions as a porogen that gets partially entrained within the polymerized product as it is formed from the monomer composition. Because the PPG has no polymerizable group, this material can be removed after formation of the polymerized product. Pores (i.e., void volume or free volume) are created when the previously entrained PPG is removed. The polymeric core particles resulting from the removal of the entrained polypropylene glycol are porous. In at least some embodiments, these porous polymeric core particles have hollow centers. The presence of pores or the presence of both pores and hollow centers make the polymeric core particles well suited for storage and delivery of various curing agent and/or curing catalysts.

The monomer composition (i.e., the first monomer composition) within the second phase contains various monomers that result in the formation of a porous (meth)acrylate polymeric material. The monomer composition contains one or more monomers having at least one (meth)acryloyl group. In many embodiments, the (meth)acrylate polymeric material is crosslinked and is formed from a monomer composition that includes a monomer having multiple (meth) acryloyl groups.

In many embodiments, the monomer composition used to form the porous polymeric core particle contains a first monomer of Formula (I)

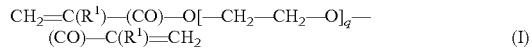
(I)

where the variable q is an integer equal to at least 1. In some embodiments, the variable q is an integer no greater than 30, no greater than 20, no greater than 16, no greater than 12, or no greater than 10 and at least 1, at least 2, or at least 3. The number average molecular weight of the ethylene oxide portion of the monomer (i.e., the group $-[CH_2CH_2-O]_q-$) is often no greater than 1200 Daltons, no greater than 1000 Daltons, no greater than 800 Daltons, no greater than 600 Daltons, no greater than 400 Daltons, no greater than 200 Daltons, or no greater than 100 Daltons. The group $R^1$ is hydrogen or methyl. The monomer of Formula (I) in the second phase is typically not miscible with the first phase.

Suitable first monomers of Formula (I) are commercially available from Sartomer (Exton, Pa., USA) under the trade designation SR206 for ethylene glycol dimethacrylate, SR231 for diethylene glycol dimethacrylate, SR205 for triethylene glycol dimethacrylate, SR206 for tetraethylene glycol dimethacrylate, SR210 and SR210A for polyethylene glycol dimethacrylate, SR259 for polyethylene glycol (200) diacrylate, SR603 (e.g., SR6030P) and SR344 for polyethylene glycol (400) di(meth)acrylate, SR252 and SR610 for polyethylene glycol (600) di(meth)acrylate, and SR740 for polyethylene glycol (1000) dimethacrylate.

In some embodiments, the first monomer of Formula (I) is the only monomer in the monomer composition of the second phase. In other embodiments, the first monomer of Formula (I) can be used in combination with at least one second monomer. The second monomer has a single ethylenically unsaturated group, which is often a (meth)acryloyl group of formula $H_2C=CR^1-(CO)-$ where $R^1$ is hydrogen or methyl. Suitable second monomers usually are not miscible with the first phase but can be either miscible or not miscible with the first monomer of Formula (I).

Some example second monomers are of Formula (III).

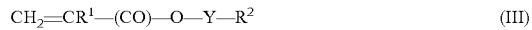
(III)

In this formula, group $R^1$ is hydrogen or methyl. In many embodiments, $R^1$ is hydrogen. Group Y is a single bond, alkylene, oxyalkylene, or poly(oxyalkylene). Group $R^2$ is a carbocyclic group or heterocyclic group. These second monomers of Formula (III) tend to be miscible with the first monomer of Formula (I) in the second phase but are not miscible with the first phase.

As used herein, the term "alkylene" refers to a divalent group that is a radical of an alkane and includes groups that are linear, branched, cyclic, bicyclic, or a combination thereof. As used herein, the term "oxyalkylene" refers to a divalent group that is an oxy group bonded directly to an alkylene group. As used herein, the term "poly(oxyalkylene)" refers to a divalent group having multiple oxyalkylene units. Suitable Y alkylene and oxyalkylene groups typically have 1 to 20 carbon atoms, 1 to 16 carbon atoms, 1 to 12 carbon atoms, 1 to 10 carbon atoms, 1 to 8 carbon atoms, 1 to 6 carbon atoms, or 1 to 3 carbon atoms. The oxyalkylene is often oxyethylene or oxypropylene. Suitable poly(oxyalkylene) groups typically have 2 to 20 carbon atoms, 2 to 16 carbon atoms, 2 to 12 carbon atoms, 2 to 10 carbon atoms, 2 to 8 carbon atoms, 2 to 6 carbon atoms, or 2 to 4 carbon atoms. The poly(oxyalkylene) is often poly(oxyethylene), which can be referred to as poly(ethylene oxide) or poly(ethylene glycol).

Carbocyclic $R^2$ groups can have a single ring or can have multiple rings such as fused rings or bicyclic rings. Each ring can be saturated, partially unsaturated, or unsaturated. Each carbon atom in a ring can be unsubstituted or substituted with alkyl groups. Carbocyclic groups often have 5 to 12 carbon atoms, 5 to 10 carbon atoms, or 6 to 10 carbon atoms. Examples of carbocyclic groups include, but are not limited to, phenyl, cyclohexyl, cyclopentyl, isobornyl, and the like. Any of these carbocyclic groups can be substituted with an alkyl group having 1 to 20 carbon atoms, 1 to 10 carbon atoms, 1 to 6 carbon atoms, or 1 to 4 carbon atoms.

Heterocyclic $R^2$ groups can have a single ring or multiple rings such as fused rings or bicyclic rings. Each ring can be saturated, partially unsaturated, or unsaturated. The heterocyclic group contains at least one heteroatom selected from oxygen, nitrogen, or sulfur. The heterocyclic group often has 3 to 10 carbon atoms and 1 to 3 heteroatoms, 3 to 6 carbon atoms and 1 to 2 heteroatoms, or 3 to 5 carbon atoms and 1 to 2 heteroatoms. Examples of heterocyclic rings include, but are not limited to, tetrahydrofurfuryl.

Exemplary monomers of Formula (III) for use as the second monomer include, but are not limited to, benzyl (meth)acrylate, 2-phenoxyethyl (meth)acrylate (commercially available from Sartomer under the trade designation SR339 and SR340), isobornyl (meth)acrylate, tetrahydrofurfuryl (meth)acrylate (commercially available from Sartomer under the trade designation SR285 and SR203), 3,3,5-trimethylcyclohexyl (meth)acrylate (commercially available from Sartomer under the trade designation CD421 and CD421A), and ethoxylated nonyl phenol acrylate (commercially available from Sartomer under then trade designation SR504, CD613, and CD612).

Other example second monomers are alkyl (meth)acrylates of Formula (IV).

In Formula (IV), group $R^1$ is hydrogen or methyl. In many embodiments, $R^1$ is hydrogen. Group $R^3$ is a linear or branched alkyl having 1 to 20 carbon atoms, 1 to 10 carbon atoms, 1 to 6 carbon atoms, or 1 to 4 carbon atoms. These second monomers tend to be miscible with the first monomer of Formula (I) in the second phase but are not miscible with the first phase.

Examples of alkyl (meth)acrylates of Formula (IV) include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, n-decyl (meth)acrylate, isodecyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate.

In some embodiments, the only monomers in the monomer composition are the first monomer of Formula (I) and the second monomer of Formula (III), Formula (IV), or both. Any suitable amounts of the first monomer and second monomer can be used. The monomer composition often contains 10 to 90 weight percent of the first monomer and 10 to 90 weight percent of the second monomer based on a total weight of monomers in the monomer composition. For example, the second phase can contain 20 to 80 weight percent of the first monomer and 20 to 80 weight percent of the second monomer, 25 to 75 weight percent of the first monomer and 25 to 75 weight percent of the second monomer, 30 to 70 weight percent of the first monomer and 30 to 70 weight percent of the second monomer, or 40 to 60 weight percent of the first monomer and 40 to 60 weight percent of the second monomer based on a total weight of monomers in the monomer composition.

Depending on the particular curing agent and/or curing catalyst that will be positioned within the polymeric core particle, it can be desirable to include at least one hydrophilic second monomer in the monomer composition. The addition of a hydrophilic second monomer tends to make the polymeric core particles more suitable for storage and delivery of hydrophilic curing agent and/or curing catalysts. Hydrophilic second monomers are selected so that they are not miscible with the first phase. These monomers may or may not be miscible with the first monomer of Formula (I).

Some example hydrophilic second monomers are hydroxyl-containing monomers of Formula (V).

In Formula (V), group $R^1$ is hydrogen or methyl. In many embodiments, $R^1$ is hydrogen. Group $R^4$ is an alkyl substituted with one or more hydroxyl groups or a group of formula $-(CH_2CH_2O)_n CH_2CH_2OH$ where n is an integer equal to at least 1. The alkyl group typically has 1 to 10 carbon atoms, 1 to 6 carbon atoms, 1 to 4 carbon atoms, or 1 to 3 carbon atoms. The number of hydroxyl groups is often in a range of 1 to 3. The variable n is often in a range of 1 to 20, in a range of 1 to 15, in a range of 1 to 10, or in a range of 1 to 5. In many embodiments, the second monomer of Formula (V) has a single hydroxyl group.

Example monomers of Formula (V) include, but are not limited to, 2-hydroxyethyl (meth)acrylate, 2-hydroxypropyl (meth)acrylate, 3-hydroxypropyl (meth)acrylate, and 4-hydroxybutyl (meth)acrylate, 2-hydroxylbutyl (meth)acrylate, polyethylene glycol mono(meth)acrylate (e.g., monomers commercially available from Sartomer (Exton, Pa., USA) under the trade designation CD570, CD571, and CD572), and glycol mono(meth)acrylate.

Other example hydrophilic second monomers are hydroxyl-containing monomers of Formula (VI).

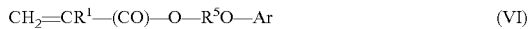

In Formula (VI), group $R^1$ is hydrogen or methyl. In many embodiments, $R^1$ is hydrogen. Groups $R^5$ is an alkylene substituted with at least one hydroxyl group. Suitable alkylene groups often have 1 to 10 carbon atoms, 1 to 6 carbon atoms, or 1 to 4 carbon atoms. The alkylene group $R^5$ can be substituted with 1 to 3 hydroxyl groups but is often substituted with a single hydroxyl group. The group Ar is an aryl group having 6 to 10 carbon atoms. In many embodiments, the Ar group is phenyl. One example monomer of Formula (VI) is 2-hydroxy-2-phenoxypropyl (meth)acrylate.

If the second monomer is of Formula (V) or (VI), which are hydroxyl-containing monomers, the amount of this monomer that can be combined with the first monomer of Formula (I) is often no greater than 2 weight percent based on a total weight of monomers in the monomer composition. If greater than about 2 weight percent of the second monomer of Formula (V) or (VI) is used, the resulting polymeric core particles tend to have diminished porosity.

Other hydrophilic monomers can be used as the second monomers in larger quantities than the second monomers of Formula (V) or (VI) without diminishing the porosity of the resulting polymeric core particles. For example, sulfonyl-containing monomers of Formula (VII) or a salt thereof can be included in the monomer composition along with the first monomer of Formula (I).

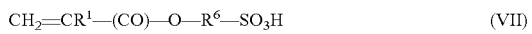

In Formula (VII), group $R^1$ is hydrogen or methyl. In many embodiments, $R^1$ is hydrogen. Group $R^6$ is an alkylene having 1 to 10 carbon atoms, 1 to 6 carbon atoms, or 1 to 4 carbon atoms. Examples of sulfonyl-containing monomers of Formula (VII) include, but are not limited to, sulfoethyl (meth)acrylate (e.g., 2-sulfoethyl methacrylate) and sulfopropyl (meth)acrylate. The sulfonyl-containing monomers can be salts under some pH conditions. That is, this monomer can have a negative charge and be associated with a positively charged counter ion. Example counter ions include, but are not limited to, alkali metals, alkaline earth metals, ammonium ions, and tetraalkyl ammonium ions.

If the second monomer is a sulfonyl-containing monomer of Formula (VII), the monomer composition can contain up to 20 weight percent of this monomer based on a total weight of monomers in the monomer composition. In some embodiments, the only monomers in the monomer composition are the first monomer of Formula (I) and the second monomer of Formula (VII). Any suitable amounts of the first monomer and second monomer can be used. The monomer composition often contains 80 to 99 weight percent of the first monomer of Formula (I) and 1 to 20 weight percent of the second monomer of Formula (VII) based on a total weight of monomers in the monomer composition. For example, the monomer composition can contain 85 to 99 weight percent of the first monomer and 1 to 15 weight percent of the second monomer, 90 to 99 weight percent of the first monomer and 1 to 10 weight percent of the second monomer, and 95 to 99 weight percent of the first monomer and 1 to 5 weight percent of the second monomer based on a total weight of monomers in the monomer composition.

In other embodiments, the monomer composition includes a first monomer of Formula (I) and two second monomers, which include a sulfonyl-containing monomer, such as those of Formula (VII), and a hydroxyl-containing monomer, such as those of Formula (V) or (VI). When the hydroxyl-containing monomer is combined with a sulfonyl-containing monomer, higher amounts of the hydroxyl-containing monomer can be added to the monomer composition without substantially decreasing the porosity of the resulting polymeric core particles. That is, the amount of the hydroxyl-containing monomer can be greater than 2 weight percent based on the weight of the monomers in the monomer composition. Such monomer compositions often contain 80 to 99 weight percent of the first monomer of Formula (I) and 1 to 20 weight percent of the second monomer, wherein the second monomer is a mixture of the sulfonyl-containing monomer of Formula (VII) and the hydroxyl-containing monomer of Formula (V) or (VI). Up to 50 weight percent, up to 40 weight percent, up to 20 weight percent, or up to 10 weight percent of the second monomer can be the hydroxyl-containing monomer.

In still other embodiments, the monomer composition includes a first monomer of Formula (I) and two second monomers, which include a sulfonyl-containing monomer, such as those of Formula (VII), and a monomer of Formula (III). Such monomer compositions often contain 1 to 20 weight percent of the monomer of Formula (VII) and 80 to 99 weight percent of a mixture of the monomer of Formula (I) and the monomer of Formula (III). For example, the monomer compositions can contain 1 to 10 weight percent of the monomer of Formula (VII) and 90 to 99 weight percent of a mixture of the monomer of Formula (I) and the monomer of Formula (III) or can contain 1 to 5 weight percent of the monomer of Formula (VII) and 95 to 99 weight percent of a mixture of the monomer of Formula (I) and the monomer of Formula (III). These compositions can be advantageous because they can be used to load either hydrophobic or hydrophilic curing agent and/or curing catalysts.

In some more specific examples, the monomer composition can contain 1 to 20 weight percent of the monomer of Formula (VII), 1 to 98 weight percent of the monomer of Formula (I), and 1 to 98 weight percent of the monomer of Formula (III). In another example, the monomer composition can contain 1 to 20 weight percent of the monomer of Formula (VII), 5 to 95 weight percent of the monomer of Formula (I), and 5 to 95 weight percent of the monomer of Formula (III). In another example, the monomer composition contains 1 to 10 weight percent of the monomer of Formula (VII), 20 to 80 weight percent of the monomer of Formula (I), and 20 to 80 weight percent of the monomer of Formula (III). In yet another example, the monomer composition contains 1 to 10 weight percent of the monomer of Formula (VII), 30 to 70 weight percent of the monomer of Formula (I), and 30 to 70 weight percent of the monomer of Formula (III). In still another example, the monomer composition contains 1 to 10 weight percent of the monomer of Formula (VII), 40 to 60 weight percent of the monomer of Formula (I), and 40 to 60 weight percent of the monomer of Formula (III).

In these monomer compositions containing the monomers of Formulas (VII), (I), and (III), the amount of the monomer of Formula (VII) can be used to control the average size of the porous polymeric core particle. For example, when about 5 weight percent of the monomer of Formula (VII) is included in the monomer composition, the resulting porous polymeric core particles have an average diameter of approximately 10 micrometers. When about 1 weight percent of the monomer of Formula (VII) is included in the monomer composition, the resulting porous polymeric core particles have an average diameter of approximately 3 micrometers.

Still other example second monomers are carboxyl-containing monomers that have a carboxylic acid group (—COOH) or salt thereof. Examples of these carboxyl-containing monomers include, but are not limited to, (meth)acrylic acid and carboxyalkyl (meth)acrylates such as 2-carboxyethyl (meth)acrylate, 3-carboxypropyl (meth)acrylate, and the like. The carboxyl-containing monomers can be salts under some pH conditions. That is, these monomer can have a negative charge and be associated with a positively charged counter ion. Example counter ions include, but are not limited to, alkali metals, alkaline earth metals, ammonium ions, and tetraalkyl ammonium ions.

Yet other second monomers are quaternary ammonium salts such as, for example, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

In addition to the first monomer of Formula (I) or to a mixture of the first monomer of Formula (I) and one or more of the second monomers described above, the monomer composition can optionally contain a third monomer with at least two polymerizable groups. The polymerizable groups are typically (meth)acryloyl groups. In many embodiments, the third monomer has two or three (meth)acryloyl groups. The third monomer typically is not miscible with the first phase and may or may not be miscible with the first monomer of Formula (I).

Some third monomers have a hydroxyl group. Such monomers can function as crosslinkers like the first monomer of Formula (I) but can provide polymeric core particles with increased hydrophilic character. This can be desirable for the storage and delivery of hydrophilic curing agent and/or curing catalysts. An example hydroxyl-containing third monomer is glycerol di(meth)acrylate.

Some third monomers are selected to have at least three polymerizable groups. Such third monomers can be added to provide more rigidity to the resulting polymeric core particles. The addition of these third monomers tends to minimize swelling of the polymeric core particles. Suitable third monomers include, but are not limited to, ethoxylated trimethylolpropane tri(meth)acrylates such as ethoxylated (15) trimethylolpropane triacrylate (commercially available under the trade designation SR9035 from Sartomer) and ethoxylated (20) trimethylolpropane triacrylate (commercially available under the trade designation SR415 from Sartomer); propoxylated trimethylolpropane tri(meth)acrylates such as propoxylated (3) trimethylolpropane triacrylate (commercially available under the trade designation SR492 from Sartomer) and propoxylated (6) trimethylolpropane triacrylate (commercially available under the trade designation CD501 from Sartomer); tris(2-hydroxyethyl) isocyanurate tri(meth)acrylates such as tris(2-hydroxyethyl) isocyanurate triacrylate (commercially available under the trade designations SR368 and SR368D from Sartomer); and propoxylated glyceryl tri(meth)acrylates such as propoxylated (3) glycerol triacrylate (commercially available under the trade designation SR9020 and SR9020HP from Sartomer).

When a third monomer is present in the monomer composition, any suitable amount can be used. The third monomer is often used in an amount up to 20 weight percent based on the total weight of monomers in the monomer composition. In some embodiments, the amount of the third monomer is up to 15 weight percent, up to 10 weight percent, or up to 5 weight percent.

The monomer composition often contains 10 to 100 weight percent of the first monomer, 0 to 90 weight percent of the second monomer, and 0 to 20 weight percent of the third monomer based on a total weight of monomers in the monomer composition. For example, the monomer composition can contain 10 to 90 weight percent of the first monomer, 10 to 90 weight percent of the second monomer, and 0 to 20 weight percent of the third monomer. The monomer composition can contain 10 to 89 weight percent of the first monomer, 10 to 89 weight percent of the second monomer, and 1 to 20 weight percent of the third monomer based on a total weight of the monomer composition.

In addition to the monomer composition, the second phase contains poly(propylene glycol), which functions as a porogen. The poly(propylene glycol) is soluble in the monomer composition within the second phase but is dispersible within the first phase. Stated differently, the poly(propylene glycol) is completely miscible with the second phase and partially miscible with the first phase. The poly(propylene glycol) is removed after polymerization of the monomer composition to provide pores (e.g., void volumes or free volumes) in the polymeric core particle. The poly(propylene glycol) does not have any polymerizable groups (i.e., it is not a monomer) and, in general, is not covalently attached to the polymeric core particles that form within the second phase. It is believed that some of the poly(propylene glycol) may become entrained within the polymerized product. The removal of the entrained poly(propylene glycol) can result in the formation of hollow polymeric core particles. It is further believed that some of the poly(propylene glycol) may be positioned on the interface between the first phase and the second phase as the polymerized product is formed in the second phase. The presence of the poly(propylene glycol) at the surface of the forming polymerized product may result in the formation of a polymeric core particles having surface porosity. The surface porosity can be seen from electron micrographs of the polymeric core particles such as in FIGS. 1A and 1B.

Any suitable molecular weight of poly(propylene glycol) can be used as the porogen. The molecular weight can affect the size of the pores that are formed in the polymeric core particles. That is, the pore size tends to increase with the molecular weight of the poly(propylene glycol). The weight average molecular weight is often at least 500 Daltons, at least 800 Daltons, or at least 1000 Daltons. The weight average molecular weight of the poly(propylene glycol) can be up to 10,000 Daltons or greater. For ease of use, a poly(propylene glycol) that is a liquid at room temperature is often selected. Poly(propylene glycol) having a weight average molecular weight up to about 4000 Daltons or 5000 Daltons tends to be a liquid at room temperature. Poly(propylene glycol) that is not a liquid at room temperature can be used if it is initially dissolved in a suitable organic solvent such as an alcohol (e.g., ethanol, n-propanol, or isopropanol). The weight average molecular weight of the poly(propylene glycol) is often in a range of 500 to 10,000 Daltons, in a range of 1000 to 10,000 Daltons, in a range of 1000 to 8000 Daltons, in a range of 1000 to 5000 Daltons, in a range of 1000 to 4000 Daltons.

The second phase can contain up to 50 weight percent poly(propylene glycol). If higher amounts of the poly(propylene glycol) are used, there may be an insufficient amount of the monomer composition included in the second phase to form polymeric core particles that are uniformly shaped. In many embodiments, the second phase can contain up to 45 weight percent, up to 40 weight percent, up to 35 weight percent, up to 30 weight percent, or up to 25 weight percent poly(propylene glycol) based on a total weight of the second phase. The second phase typically contains at least 5 weight percent poly(propylene glycol). If lower amounts of the poly(propylene glycol) are used, the porosity of the resulting polymeric core particles may be insufficient. That is, the void volume of the polymeric core particles may be insufficient to load and deliver an effective amount of a curing agent and/or curing catalyst. The second phase typically can contain at least 10 weight percent, at least 15 weight percent, or at least 20 weight percent poly(propylene glycol). In some embodiments, the second phase contains 5 to 50 weight percent, 10 to 50 weight percent, 10 to 40 weight percent, 10 to 30 weight percent, 20 to 50 weight percent, 20 to 40 weight percent, or 25 to 35 weight percent poly(propylene glycol) based on the total weight of the second phase.

In some embodiments, the second phase contains 50 to 90 weight percent monomer composition and 10 to 50 weight percent poly(propylene glycol), 60 to 90 weight percent monomer composition and 10 to 40 weight percent poly(propylene glycol), 50 to 80 weight percent monomer composition and 20 to 50 weight percent poly(propylene glycol), or 60 to 80 weight percent monomer composition and 20 to 40 weight percent poly(propylene glycol) based on a total weight of the second phase.

In addition to the monomer composition and poly(propylene glycol), the second phase often contains an initiator for free radical polymerization of the monomer composition. Any suitable initiator known in the art can be used. The initiator can be a thermal initiator, a photoinitiator, or both. The specific initiator used is often selected based on its solubility in the second phase. The initiator is often used at a concentration of 0.1 to 5 weight percent, 0.1 to 3 weight percent, 0.1 to 2 weight percent, or 0.1 to 1 weight percent based on the weight of monomers in the monomer composition.

When a thermal initiator is added to the reaction mixture, polymeric core particles can be formed at room temperature (i.e., 20° C. to 25° C.) or at an elevated temperature. The temperature needed for polymerization often depends on the particular thermal initiator used. Examples of thermal initiators include organic peroxides and azo compounds.

When a photoinitiator is added to the reaction mixture, polymeric core particles can be formed by the application of actinic radiation. Suitable actinic radiation includes electromagnetic radiation in the infrared region, visible region, ultraviolet region, or a combination thereof.

Examples of photoinitiators suitable in the ultraviolet region include, but are not limited to, benzoin, benzoin alkyl ethers (e.g., benzoin methyl ether and substituted benzoin alkyl ethers such 4,4'-dimethoxybenzoin), phenones (e.g., substituted acetophenones such as 2,2-dimethoxy-2-phenylacetophenone and substituted alpha-ketols such as 2-methyl-2-hydroxypropiophenone), phosphine oxides, polymeric photoinitiators, and the like.

Commercially available photoinitiators include, but are not limited to, 2-hydroxy-2-methyl-1-phenyl-propane-1-one (e.g., commercially available under the trade designation IRGACURE 1173 from BASF, Florham Park, N.J., USA), a mixture of 2,4,6-trimethylbenzoyl-diphenyl-phosphine oxide and 2-hydroxy-2-methyl-1-phenyl-propan-1-one (e.g., commercially available under the trade designation IRGACURE 4265 from BASF), 2,2-dimethoxy-1,2-diphenylethan-1-one (e.g., commercially available under the trade designation IRGACURE 651 from BASF), a mixture of bis(2,6-dimethoxybenzoyl)-2,4,4-trimethyl-pentylphosphine oxide and 1-hydroxy-cyclohexyl-phenyl-ketone (e.g., commercially available under the trade designation IRGACURE 1800 from BASF), a mixture of bis(2,6-dimethoxybenzoyl)-2,4,4-trimethyl-pentylphosphine oxide (e.g., commercially available under the trade designation IRGACURE 1700 from BASF), 2-methyl-1[4-(methylthio)phenyl]-2-morpholinopropan-1-one (e.g., commercially available under the trade designation IRGACURE 907 from BASF), 1-hydroxy-cyclohexyl-phenyl-ketone (e.g., commercially available under the trade designation IRGACURE 184 from BASF), 2-benzyl-2-(dimethylamino)-1-[4-(4-morpholinyl)phenyl]-1-butanone (e.g., commercially available under the trade designation IRGACURE 369 from BASF), bis(2,4,6-trimethylbenzoyl)-phenylphosphine oxide (e.g., commercially available under the trade designation IRGACURE 819 from BASF), ethyl 2,4,6-trimethylbenzoyldiphenyl phosphinate (e.g., commercially available from BASF, under the trade designation IRGACURE TPO-L), and 2,4,6-trimethylbenzoyldiphenylphosphine oxide (e.g., commercially available from BASF, under the trade designation IRGACURE TPO).

The reaction mixture often includes at least 5 weight percent of the second phase (dispersed phase) and up to 95 weight percent of the first phase (continuous phase). In some embodiments, the reaction mixture contains 5 to 40 weight percent second phase and 60 to 95 weight percent first phase, 5 to 30 weight percent second phase and 70 to 95 weight percent first phase, 10 to 30 weight percent second phase and 70 to 90 weight percent first phase, or 5 to 20 weight percent second phase and 80 to 95 weight percent first phase. The weight percentages are based on a total weight of the reaction mixture.

To prepare the polymeric core particles, droplets of the second phase are formed in the first phase. The components of the second phase are often mixed together prior to addition to the first phase. For example, the monomer composition, initiator, and the poly(propylene glycol) can be blended together and then this blended composition, which is the second phase, can be added to the first phase. The resulting reaction mixture is often mixed under high shear to form a micro-emulsion. The size of the dispersed second phase droplets can be controlled by the amount of shear, the mixing rate, and the composition. The size of the droplets can be determined by placing a sample of the mixture under an optical microscope prior to polymerization. Although any desired droplet size can be used, the average droplet diameter is often less than 200 micrometers, less than 100 micrometers, less than 50 micrometers, less than 25 micrometers, less than 10 micrometers, or less than 5 micrometers. For example, the average droplet diameter can be in the range of 1 to 200 micrometers, 1 to 100 micrometers, 5 to 100 micrometers, 5 to 50 micrometers, 5 to 25 micrometers, or 5 to 10 micrometers.

If a photoinitiator is used, the reaction mixture is often spread on a non-reactive surface to a thickness that can be penetrated by the desired actinic radiation. The reaction mixture is spread using methods that do not cause the droplets to coalesce. For example, the reaction mixture can be formed using an extrusion method. Often, the actinic radiation is in the ultraviolet region of the electromagnetic spectrum. If the ultraviolet radiation is applied from only the top surface of the reaction mixture layer, the thickness of the layer can be up to about 10 millimeters. If the reaction mixture layer is exposed to ultraviolet radiation from both the top and bottom surfaces, the thickness can be greater such as up to about 20 millimeters. The reaction mixture is subjected to the actinic radiation for a time sufficient to react the monomer composition and form polymeric core particles. The reaction mixture layer is often polymerized within 5 minutes, within 10 minutes, within 20 minutes, within 30 minutes, within 45 minutes, or within 1 hour depending on the intensity of the actinic radiation source and the thickness of the reaction mixture layer.

If a thermal initiator is used, the droplets can be polymerized while continuing to mix the reaction mixture. Alternatively, the reaction mixture can be spread on a non-reactive surface to any desired thickness. The reaction mixture layer can be heated from the top surface, from the bottom surface, or both to form the polymeric core particles. The thickness is often selected to be comparable to that used when a photoinitiator is used in combination with actinic radiation such as ultraviolet radiation.

In many embodiments, a photoinitiator is preferred over a thermal initiator because lower temperatures can be used for polymerization. That is, actinic radiation such as ultraviolet radiation can be used to minimize degradation of various components of the reaction mixture that might be sensitive to temperatures needed for use with thermal initiators. Further, the temperatures typically associated with the use of thermal initiators may undesirably alter the solubility of the various components of the reaction mixture between the first phase and the dispersed second phase.

During the polymerization reaction, the monomer composition reacts within the dispersed second phase droplets suspended in the first phase. As the polymerization progresses, the poly(propylene glycol) included in the second phase gets partially entrained within the polymerized product. Although it is possible that some portion of the poly(propylene glycol) can be covalently attached to the polymeric product through a chain transfer reaction, preferably the poly(propylene glycol) is not bonded to the polymeric product. The polymerized product is in the form of particles. In some embodiments, the particles are polymeric beads having a relatively uniform size and shape.

After formation of the polymerized product (i.e., polymeric core particles containing entrained poly(propylene glycol)), the polymerized product can be separated from the first phase. Any suitable separation method can be used. For example, water is often added to lower the viscosity of the first phase. The particle of the polymerized product can be separated by decantation, filtration, or centrifugation. The particles of the polymerized product can be further washed by suspending them in water and collecting them a second time by decantation, filtration, centrifugation, or drying.

The particles of the polymerized product can then be subjected to one or more washing steps to remove the poly(propylene glycol) porogen. Suitable solvents for removing the poly(propylene glycol) include, for example, acetone, methyl ethyl ketone, toluene, and alcohols such as ethanol, n-propanol, or isopropanol. Stated differently, the entrained poly(propylene glycol) is removed from the polymerized product using solvent extraction methods. Pores are created where the poly(propylene glycol) previously resided.

In many embodiments, the resulting porous polymeric core particles (the polymerized product after removal of the poly(propylene glycol) porogen) have an average diameter that is less than 200 micrometers, less than 100 micrometers, less than 50 micrometers, less than 25 micrometers, less than 10 micrometers, or less than 5 micrometers. For example, the porous polymeric core particles can have an average diameter in the range of 1 to 200 micrometers, 1 to 100 micrometers, 5 to 100 micrometers, 5 to 50 micrometers, 5 to 25 micrometers, or 5 to 10 micrometers.

Figure 1B:
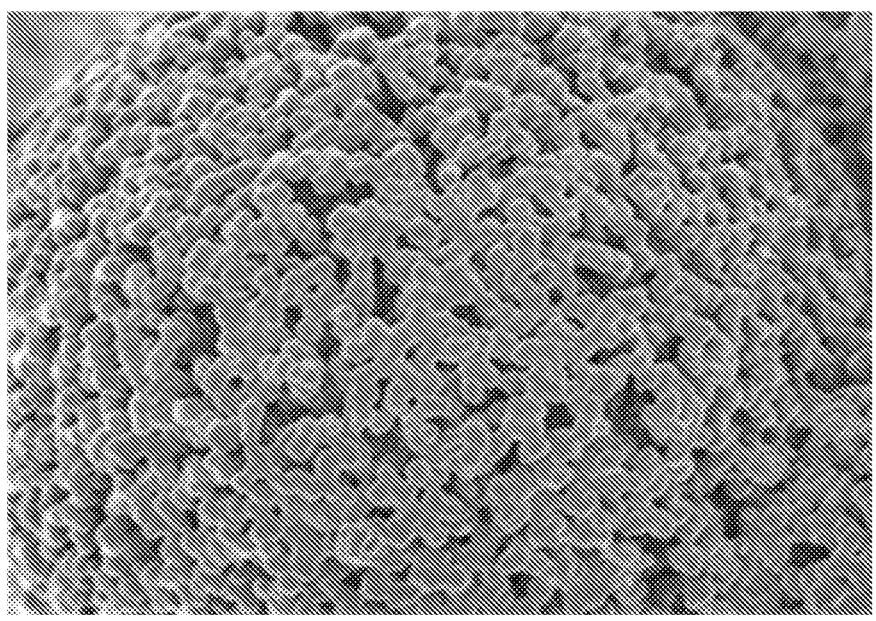

The polymeric core particles usually have multiple pores distributed over the surface of the particles as seen in FIGS. 1A and 1B. Based on the diameter of the particles and the dimensions of the pores, the polymeric core particles can be described as being micro-particles (the average diameter is typically in a range of 1 to 200 micrometers, in the range of 1 to 100 micrometers, or in the range of 1 to 50 micrometers) and nano-porous (the pores have dimensions in an nanometer range such as in the range of 1 to 200 nanometers, in the range of 10 to 200 nanometers, in the range of 20 to 200 nanometers, or in the range of 50 to 200 nanometers). In some embodiments, the polymeric core particles are hollow in addition to having multiple pores distributed over the surface of the particles. As used herein, the term "hollow" refers to polymeric core particles that have a polymeric exterior surrounding an inner region (cavity or core) that is not polymeric.

Once formed, the porous polymeric core particles or the hollow and porous polymeric core particles are well suited for storage and delivery of a curing agent and/or curing catalyst. The curing agent and/or curing catalyst is positioned or loaded within the porous polymeric core particle. The curing agent and/or curing catalyst is not covalently bonded to the polymeric core particle in the loaded polymeric core particle or in the final composite particle. The composite particle includes the loaded polymeric core particle and a layer of a fluorinated polymer coating around the loaded polymeric core particle. Under suitable conditions, the curing agent and/or curing catalyst can be released (i.e., delivered) from the composite particle. When the composite particles contain a curing agent, the released curing agent can react with the epoxy resin to form a cured composition. That is, the curing agent is consumed in the reaction with the epoxy resin and becomes part of the chemical structure of cured composition (e.g., cured epoxy resin). When the composite particles contain a curing catalyst, the released curing catalyst can catalyze, accelerate, or initiate the self-polymerization of the epoxy resin and/or can catalyze, accelerate, or initiate the reaction of a curing agent with the epoxy resin. In some embodiments, both a curing agent and a curing catalyst are loaded within the porous polymeric core particle. In other embodiments, only a curing catalyst is loaded within the porous polymeric core particle. In still other embodiments, only a curing agent is loaded within the porous polymeric core particle.

If all of the monomers in the monomer composition used to form the porous polymeric core particle are hydrophobic, the resulting particles tend to be hydrophobic (i.e., hydrophobic polymeric core particles) and can accept (e.g., be loaded with) hydrophobic curing agents and/or curing catalysts. If some of the monomers in the monomer composition are hydrophilic, however, the polymeric core particles tend to have sufficient hydrophilic character (i.e., hydrophilic polymeric core particles) to accept hydrophilic curing agents and/or curing catalysts. Further, if the monomer composition includes a mixture of both hydrophobic monomers and hydrophilic monomers, the polymeric core particles tend to have sufficient hydrophobic and hydrophilic character to accept both hydrophobic and hydrophilic curing agents and/or curing catalysts. In some embodiments, polymeric core particles having both hydrophobic and hydrophilic character can be desirable.

While any suitable curing agent can be used such as mercaptan compounds and anhydride compounds, the curing agent is typically a nitrogen-containing compound. Some curing agents have at least two groups of formula —NR$^7$H where R$^7$ is hydrogen, alkyl, aryl, or alkylaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atoms such as a phenyl or biphenyl group. Suitable alkylaryl groups can be either an alkyl substituted with an aryl or an aryl substituted with an alkyl. The same aryl and alkyl groups discussed above can be used in the alkylaryl groups. In most embodiments, R$^7$ is hydrogen or alkyl.

When the curing agent diffuses from the composite particle into the epoxy resin, the primary and/or secondary amino groups of the curing agent react with the oxirane groups of the epoxy resin. This reaction opens the oxirane groups and covalently bonds the curing agent to the epoxy resin. The reaction results in the formation of divalent groups of formula —OCH$_2$—CH$_2$—NR$^7$— where R$^7$ is the same as defined above.

The curing agent and/or curing catalyst minus the at least two amino groups (i.e., the portion of the curing agent that is not an amino group) can be any suitable aromatic group, aliphatic group, or combination thereof. Some amine curing agents are of Formula (VIII) with the additional limitation that there are at least two primary amino groups, at least two secondary amino groups, or at least one primary amino group and at least one secondary amino group.

(VIII)

Each R$^7$ group is independently hydrogen, alkyl, aryl, or alkylaryl as defined above. Each R$^8$ is independently an alkylene, heteroalkylene, or combination thereof. Suitable alkylene groups often have 1 to 20 carbon atoms, 1 to 16 carbon atoms, 1 to 10 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms and up to 20 heteroatoms, up to 16 heteroatoms, up to 12 heteroatoms, or up to 10 heteroatoms. The heteroatoms are often oxy groups. The variable m is an integer equal to at least one and can be up to 10 or higher, up to 5, up to 4, or up to 3.

Some amine curing agents can have an R$^8$ group selected from an alkylene group. Examples include, but are not limited to, ethylene diamine, diethylene triamine, triethylene tetramine, propylene diamine, dipropylene triamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), 1,3 bis-aminomethyl cyclohexane, 1,10-dimainodecane, 1,12-diaminododecene, and the like.

Other amine curing agents can have an $R^8$ group selected from a heteroalkylene group such as a heteroalkylene having oxygen heteroatoms. For example, the curing agent can be a compound such as aminoethylpiperazine, 4,7,10-trioxatridecane-1,13-diamine (TTD) (which is available from TCI America in Portland, Oreg., USA), or a poly(alkylene oxide) diamine (also called polyether diamines) such as a poly (ethylene oxide) diamine, poly(propylene oxide) diamine, or a copolymer thereof. Commercially available polyether diamines are commercially available under the trade designation JEFFAMINE from Huntsman Corporation in The Woodlands, Tex., USA.

Still other amine curing agents can be formed by reacting a polyamine (i.e., a polyamine refers to an amine with at least two amino groups selected from primary amino groups and/or secondary amino groups) with another reactant to form an amine-containing adduct having at least two primary and/or secondary amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. Such a polyamidoamine can be prepared as described, for example, in U.S. Pat. No. 5,629,380 (Baldwin et al.). A molar excess of the polymeric diamine is often used so that the curing agent includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1.

The curing agent can also be one or more aromatic rings substituted with multiple amino groups or with amino-containing groups. Such curing agents include, but are not limited to, xylene diamines (e.g., meta-xylene diamine) or similar compounds. For example, one such curing agent is commercially available under the trade designation ANCAMINE (e.g., ANCAMINE 2609) from Air Products and Chemicals, Inc., in Allentown, Pa., USA and under the trade designation ARADUR 2965 from Huntsman Corporation (The Woodlands, Tex., USA). This particular curing agent is based on meta-xylene diamine. Another example curing agent is 4,4'-diaminodiphenyl sulfone (DDS), which is commercially available as ARADUR 9964-1 from Huntsman Corporation.

Still other curing agents include hydrazine, hydrazide or derivatives thereof (e.g., aminodihydrazide, adipic dihydrazide, and isophthalyl dihydrazide), guanidines or derivatives thereof, and dicyanamide (DICY) or derivatives thereof.

In place of a curing agent or in addition to a curing agent such as those described above, the porous polymeric core particle can be loaded with a curing catalyst. These curing catalyst compounds can be accelerators for curing agents such as those listed, can be a catalyst for self-polymerization of the epoxy resin or for reaction of the epoxy resin with the curing agent, or can be an initiator for self-polymerization of the epoxy resin for reaction of the epoxy resin with the curing agent.

Some curing catalysts are phenols substituted with tertiary amino groups can be of Formula (IX).

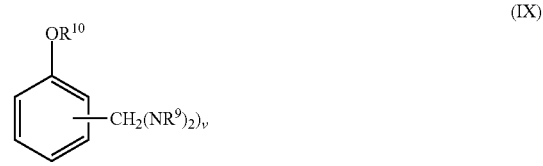

In Formula (IX), each group $R^9$ is independently an alkyl. The variable v is an integer equal to 2 or 3. Group $R^{10}$ is hydrogen or alkyl. Suitable alkyl groups for $R^9$ and $R^{10}$ often have 1 to 12 carbon atoms, 1 to 8 carbon atoms, 1 to 6 carbon atoms, or 1 to 4 carbon atoms. One exemplary secondary curative of Formula (IX) is tris-2,4,6-(dimethylaminomethyl)phenol that is commercially available under the trade designation ANCAMINE K54 from Air Products and Chemicals, Inc., of Allentown, Pa., USA. These compounds often accelerate the curing agents discussed above.

Another class of curing catalysts are substituted ureas such as, for example, bis-substituted ureas. Examples include, but are not limited to, 4,4'-methylene bis(phenyl dimethyl) urea, toluene diisocyanate urea, 3-(4-chlorophenyl)-1,1-dimethylurea, and various compounds that are commercially available from CVC Thermoset Specialties under the trade designation OMICURE (e.g., OMICURE U-35 (which is a cycloaliphatic bisurea), U-52, and U-52M).

Yet another class of curing catalysts are various sulfonic acidic compounds and salts thereof, such as those commercially available under the trade designation NACURE from King Industries, Inc., of Norwalk, Conn., USA.

Still other curing catalysts are imidazoles or salts thereof or imidazolines or salts thereof. A first type of these compounds can react with an epoxy resin at room temperature. A second type of these compounds can react with the epoxy resin after being heated above their melting point (e.g., above 150° C., above 170° C., or above 200° C.). The second type of compounds can be referred to as "latent curatives" or "blocked curatives."

The first type of imidazole compounds (i.e., those that can react below their melting point) are often substituted at the 1-position or the 2-position of the imidazole ring. In epoxy systems, this type of imidazole compound can be used as accelerators or catalysts for other curing agents and can also act as curing catalysts for epoxy resins. Examples of those used as catalysts or accelerators include: 2-methyl-imidazole, 2-ethyl-4-methyl imidazole, 2-phenyl imidazole, 2-phenyl-4-methyl imidazole, 1,2-dimethylimidazole, 2-heptadecyl imidazole, 1-benzyl-2-methyl imidazole, 1-benzyl-2-phenyl-imidazole, and 2-phenyl-4,5-dihydroxymethyl imidazole (commercially available from Air Products and Chemicals Inc., under the trade designation CUREZOL 2PZ-S).

The second type of imidazole compounds (i.e., those that can react above their melting point) are commercially available from Air Products and Chemicals Inc., under the trade designation CUREZOL 2MA-AZINE (which is 2,4-di-amino-6(2'-methylimidazoleyl-(1'))ethyl-s-triazine), and CUREZOL 2MA-OK (which is 2,4-diamino-6(2'-methyl-imidazolyl-(1')(ethyl-s-triazine isocyanurate adduct))), and under the trade designation ARADUR 3123, which is 1-((2- methyl-1H-imidazol-1-yl)methyl)naphthalen-2-ol from Huntsman Corporation. Other imidazole compounds are metal imidazole salts such as those described in U.S. Pat. No. 4,948,449 (Tarbutton et al.).

Further compounds suitable for use as curing catalysts for epoxy resins are Lewis acids. Example Lewis acids include, but are not limited to, boron trifluoride ($BF_3$), boron trichloride ($BCl_3$), zinc chloride ($ZnCl_2$), stannic chloride ($SnCl_4$), antimony pentachloride ($SbCl_5$), antimony pentafluoride ($SbF_5$), ferric chloride ($FeCl_3$), aluminum trichloride ($AlCl_3$), arsenic pentafluoride ($AsF_5$), and phosphorous pentafluoride ($PF_5$). Due to their high reactivity, the Lewis acids are often complexed with a nitrogen-containing compound and/or with a hydroxy-containing compound. The complexes are often a liquid at room temperature (e.g., 20° C. to 25° C.); being a liquid facilitates use of the Lewis acids because they can be readily introduced into the porous polymeric core particles to form loaded polymeric core particles. The molar ratio of the Lewis acid to the complexing agent is typically about 1:1 but can be higher depending on the particular Lewis acid and the particular complexing agent. Methods of preparing the Lewis acid complexes are described, for example, in U.S. Pat. No. 3,565,861 (White et al.), U.S. Pat. No. 4,503,161 (Korbel et al.), U.S. Pat. No. 4,503,211 (Robins), and U.S. Pat. No. 5,731,369 (Mahoney).

Suitable nitrogen-containing compounds that can be complexed with the Lewis acid are alkyl amines, heteroalkyl amines, aryl amines, aralkyl amines, alkaryl amines, alkylene diamines, arylene diamines, and alkaryl diamines. Suitable alkyl amines often have an alkyl group with 1 to 20 carbon atoms, 1 to 12 carbon atoms, 1 to 10 carbon atoms, 1 to 6 carbon atoms, or 1 to 4 carbon atoms. Example alkyl amines include, but are not limited to, methylamine, ethylamine, isopropyl amine, n-propyl amine, n-butyl amine, isobutyl amine, tent-butyl amine, n-hexyl amine, isohexyl amine, cyclohexyl amine, lauryl amine, and stearyl amine. Suitable heteroalkyl amines often have 2 to 20 carbon atoms and 1 to 10 oxygen heteroatoms. Example heteroalkyl amines include, but are not limited to, methoxyethyl amine, ethoxyethyl amine, and ethoxypropyl amine. Suitable aralkyl (i.e., alkyl substituted with an aryl) amines often have an alkyl group with 1 to 10 carbon atoms, 1 to 6 carbon atoms, or 1 to 4 carbon atoms and a phenyl group. Examples include, but are not limited to, benzyl amine and phenylethyl amine. Suitable aryl amines often have an aryl group such as phenyl or naphthyl. Examples are aniline or 1-napthtylamine. Suitable alkaryl (i.e, aryl substituted with an alkyl) amines often have a phenyl ring substituted with 1 to 5 alkyl groups (e.g., 1 to 4 alkyl groups, 1 to 3 alkyl groups or 1 to 2 alkyl groups) with each alkyl group having 1 to 10 carbon atoms, 1 to 6 carbon atoms, or 1 to 4 carbon atoms. Examples include, but are not limited to, 2-methylaniline, 2-isopropylaniline, 2-propylaniline, 2-hexylaniline, 2,4-dimethylaniline, 2,5-dimethylaniline, 2,6-dimethylaniline, 2,6-diethylaniline, N-2,6-triethylaniline, N-methyl-2,6-diethylaniline, N,N,2-trimethylaniline, N,N,2,6-tetramethylaniline, 2,6-dipropylaniline, 2,6-diisobutylaniline, 2,6-di-n-butylaniline, 2,6-di-n-pentylaniline, N,N-diethyl-2-n-butylaniline, 2,3,4,5,6-pentamethylaniline, N-propylaniline, N-n-hexylaniline, N-sec-butylaniline, and 2-ethyl-6-sec-butylaniline. Suitable alkylene diamines often have an alkylene (i.e., divalent radical of an alkane) with 1 to 20 carbon atoms, 1 to 10 carbon atoms, 1 to 6 carbon atoms, or 1 to 4 carbon atoms. Example alkylene diamines include, but are not limited to, methylene diamine, ethylene diamine, propylene diamine, and butylene diamine. Example arylene diamines are often phenylene diamines such as m-phenylene diamine, o-phenylene diamine, and p-phenylene diamine. Suitable alkarylene diamines often are phenylene substituted with 1 to 4 alkyl groups (e.g., 1 to 3 alkyl groups or 1 to 2 alkyl groups) with each alkyl group having 1 to 10 carbon atoms, 1 to 6 carbon atoms, or 1 to 4 carbon atoms. Examples include but are not limited to, 2,6-dimethyl-m-phenylene diamine and 2,6-diethyl-m-phenylene diamine.

Suitable hydroxy-containing compounds that can be complexed with the Lewis acid are often polyhydric alcohols. The polyhydric alcohols can have two or more hydroxyl groups (e.g., 2 to 6 hydroxyl groups or 2 to 4 hydroxyl groups). In some embodiments, the polyhydric alcohol is an alkylene glycol (i.e., alkylene diol), dialkylene glycol, or polyalkylene glycol having more than 2 alkylene segments. Suitable alkylene diols often have 1 to 20 carbon atoms, 1 to 12 carbon atoms, 1 to 10 carbon atoms, 1 to 6 carbon atoms, or 1 to 4 carbon atoms. Example alkylene diols include, but are not limited to, ethylene glycol, propylene glycol, 1,2-propane diol, butylene glycol, 1,3-butane diol, 2-methyl-1,3-propane diol, 2,2-dimethyl-1,3-propane diol, 1,5-pentane diol, 2-ethyl-1,3-pentane diol, 2-ethyl-1,6-hexane diol, 1,8-octane diol, 1,4-cyclohexyl diol, neopentyl diol, bis(hydroxymethyl)cyclohexane, and 1,18-octadecane diol. Suitable dialkylene glycol and polyalkylene glycols often have alkylene segments with 2 to 6 carbon atoms or 2 to 4 carbon atoms. Examples include, but are not limited to, ethylene glycol, diethylene glycol, glycerol, propylene glycol, dipropylene glycol, polyethylene glycol, and polypropylene glycol. The polyalkylene glycols typically have a weight average molecular weight no greater than 10,000 Daltons, no greater than 5,000 Daltons, no greater than 1,000 Daltons, or no greater than 500 Daltons. The weight average molecular weight of the polyalkylene glycols is often at least 100 Daltons, at least 200 Daltons, or at least 300 Daltons. In other embodiments, the polyhydric alcohol is an aliphatic compound with more than two hydroxyl groups. Examples include, but are not limited to, glycerol, trimethylolethane, trimethylolpropane, pentaerythritol, 2-ethyl-2-(hydroxymethyl)-1,3-propane diol, 1,2,6-hexane triol, mannitol, and sorbitol. In still other embodiments, the polyhydric alcohol is an aromatic compound such as m-cresol or p-cresol.

Any suitable method can be used to position (i.e., to load) the curing agent and/or curing catalyst in the porous polymeric core particle once the porogen has been removed. The curing agent and/or curing catalyst is typically positioned within the polymeric core particle prior to formation of the fluoropolymer-containing coating layer around the polymeric core particle. In some embodiments, the curing agent and/or curing catalyst is a liquid at room temperature and the polymeric core particles are mixed with the liquid to load the curing agent and/or curing catalyst (e.g., to position the curing agent and/or curing catalyst within the polymeric core particles). In other embodiments, the curing agent and/or curing catalyst can be dissolved in a suitable organic solvent or water and the polymeric core particles are exposed to the resulting solution. Any organic solvent that is used is typically selected so that it does not dissolve the polymeric core particles. When an organic solvent or water is used, at least some of the organic solvent or water may be loaded within the polymeric core particle in addition to the curing agent and/or curing catalyst.

When the curing agent and/or curing catalyst is dissolved in an organic solvent or water, the concentration is typically selected to be as great as possible to shorten the time needed to load a suitable amount of the curing agent and/or curing catalyst within the polymeric core particle. The amount of curing agent and/or curing catalyst loaded and the amount of time required for loading (i.e., positioning within the polymeric core particle) are often dependent, for example, on the composition of the monomers used to form the polymeric core particle, the rigidity of the polymeric core particle (e.g., the amount of crosslinking), and the compatibility of the curing agent and/or curing catalyst with the polymeric core particle. The loading time is often less than 24 hours, less than 18 hours, less than 12 hours, less than 8 hours, less than 4 hours, less than 2 hours, less than 1 hour, less than 30 minutes, less than 15 minutes, or less than 5 minutes. After loading, the particles are typically separated from the solution containing the curing agent and/or curing catalyst by decantation, filtration, centrifugation, drying, or the like.

The volume of curing agent and/or curing catalyst loaded can be up to the volume of poly(propylene glycol) removed from the polymerized product used to form the polymeric core particles. That is, the curing agent and/or curing catalyst can fill the voids left after removal of the poly(propylene glycol). In many embodiments, the amount of curing agent and/or curing catalyst in the composite particle can be up to 70 weight percent, up to 60 weight percent, up to 50 weight percent, or up to 40 weight percent based on a total weight of the composite particles. The amount can be at least 1 weight percent, at least 5 weight percent, at least 10 weight percent, at least 20 weight percent, at least 30 weight percent, at least 40 weight percent, or at least 50 weight percent. For example, the curing agent and/or curing catalyst in the composite particle can be in a range of 1 to 70 weight percent, in a range of 1 to 60 weight percent, in a range of 5 to 60 weight percent, in a range of 5 to 50 weight percent, in a range of 5 to 40 weight percent, in a range of 5 to 30 weight percent, in a range of 5 to 20 weight percent, in a range of 10 to 60 weight percent, in a range of 10 to 30 weight percent, in a range of 20 to 60 weight percent, in a range of 20 to 50 weight percent, in a range of 30 to 50 weight percent, or in a range of 40 to 50 weight percent based on the total weight of the composite particles.

A fluoropolymer-containing coating layer is positioned around the porous polymeric core particle loaded with the curing agent and/or curing catalyst (i.e., a fluoropolymer-containing coating layer is positioned around the loaded polymeric core particle). Any suitable fluorinated polymer that is a thermoplastic and that allows the release of the curing agent and/or curing catalyst from the porous polymeric core particle through the coating layer can be used. The fluorinated polymer included in the coating layer is typically a thermoplastic polymers that can soften when exposed to heat. The thermoplastic is usually selected so that it is not tacky (i.e., the glass transition temperature of the fluorinated polymer is typically at least 20° C., at least 30° C., at least 40° C., or at least 50° C.). The fluorinated polymer is typically a linear polymer and is not crosslinked or is crosslinked to such a low amount that it can be dissolved in a suitable solvent, which is typically a fluorinated solvent.

The fluorinated polymer is often the polymerized product of a monomer composition (second monomer composition) containing one or more fluorinated monomers. The fluorinated monomers often have a (meth)acryloyl group. In many embodiments, the fluorinated monomer is of Formula (X)

where $R^1$ is hydrogen or methyl, Rf is an fluorinated alkyl and Q is a divalent linking group. Group Q is not fluorinated.

Group Rf can be partially fluorinated or fully fluorinated (i.e., the fluorinated alkyl is a perfluoroalkyl).

In some embodiments, the fluorinated alkyl has zero or one hydrogen atom. That is, the fluorinated alkyl is a perfluoroalkyl (i.e., the fluorinated alkyl has no hydrogen atoms) or the fluorinated alkyl has a single hydrogen atom at the end of the Rf group furthest from group Q (i.e., the hydrogen atom is attached to the carbon atom furthest away from group Q). Suitable Rf fluorinated alkyl groups often have at least 1 carbon atom, at least 2 carbon atoms, or at least 3 carbon atoms and can have up to 12 carbon atoms, up to 10 carbon atoms, up to 8 carbon atoms, or up to 6 carbon atoms. In many embodiments, the Rf group has 3 to 5 carbon atoms.

Any suitable divalent Q linking group can be used. Example Q groups include, but are not limited to, $-SO_2-NR^{11}-(CH_2)_k-$, $-(CH_2)_k-$, $-(CH_2)_k-O-(CH_2)_k-$, $-(CH_2)_k-SO_2-(CH_2)_k-$, $-(CH_2)_k-SO_2-NR^{11}-(CH_2)_k-$, $-(CH_2)_k-S-(CH_2)_k-$, $-(CO)-NR^{11}-(CH_2)_k-$, $-CH_2CH(OR^{12})-CH_2-$, $-(CH_2)_k-SO_2-$, and $-O-(CO)-NR^{11}-(CH_2)_k-$. In these Q groups, $R^{11}$ is hydrogen, alkyl, or aryl. The group $R^{12}$ is hydrogen or alkyl. Suitable alkyl groups for $R^{11}$ and $R^{12}$ have 1 to 10 carbon atoms, 1 to 6 carbon atoms, or 1 to 4 carbon atoms. $R^{11}$ aryl groups can have 6 to 10 carbon atoms but is often phenyl. The variable k is an integer in a range of 1 to 20, 1 to 10, 1 to 6, 1 to 4, or 1 to 3.

In some embodiments, the fluorinated monomers of Formula (X) are of Formula (X-1) where the linking group Q is Formula (X) is $-(CH_2)_k-$.

In Formula (X-1), the groups $R^1$ and Rf and the variable k are the same as defined above for Formula (X). In some particular embodiments, the Rf has 3 or 5 carbon atoms and the variable k is either 1 or 2. Specific examples of fluorinated monomers of Formula (X) include, but are not limited to, $C_3F_7CH_2O(CO)C(CH_3)=CH_2$, $C_3F_7CH_2CH_2O(CO)C(CH_3)=CH_2$, $C_5F_{11}CH_2O(CO)C(CH_3)=CH_2$, and $C_5F_{11}CH_2CH_2O(CO)C(CH_3)=CH_2$.

In other embodiments, the fluorinated monomers of Formula (X) are of Formula (X-2) where the linking group Q in Formula (X) is $-SO_2-NR^{11}-(CH_2)_k-$.

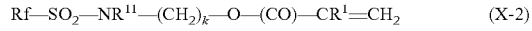

In Formula (X-2), the groups Rf, $R^{11}$, $R^1$, and the variable k are the same as defined for Formula (X) or group Q in Formula (X). In some embodiments, Rf has 1 to 6 carbon atoms or 3 to 6 carbon atoms and k is equal to 2. Specific examples of fluorinated monomers of Formula (XI) include, but are not limited to, $C_4F_9SO_2N(CH_3)CH_2CH_2O(CO)C(CH_3)=CH_2$, $C_4F_9SO_2N(CH_3)CH_2CH_2O(CO)CH=CH_2$, $C_4F_9SO_2N(C_4H_9)CH_2CH_2O(CO)C(CH_3)=CH_2$, $C_4F_9SO_2N(C_8H_{17})CH_2CH_2O(CO)C(CH_3)=CH_2$, $C_4F_9SO_2NHCH_2CH_2O(CO)C(CH_3)=CH_2$, $C_6F_{13}SO_2N(CH_3)CH_2CH_2O(CO)C(CH_3)=CH_2$, and $CF_3SO_2N(CH_3)CH_2CH_2O(CO)C(CH_3)=CH_2$.

The fluorinated monomers of Formula (X) (such as those of Formula (X-1) or (X-2)) can be polymerized to form a homopolymer or can be copolymerized with various non-fluorinated monomers such as, for example, an alkyl (meth)acrylate of Formula (XI).

In Formula (XI), group $R^1$ is hydrogen or methyl and group $R^{13}$ is an alkyl having at least 1 carbon atom, at least 2 carbon atoms, at least 4 carbon atoms, at least 6 carbon atoms, or at least 10 carbon atoms and having up to 20 carbon atoms, up to 16 carbon atoms, or up to 12 carbon atoms. In some embodiments, $R^{14}$ has 1 to 20 carbon atoms such as 4 to 20 carbon atoms, 4 to 12 carbon atoms, 10 to 20 carbon atoms, or 16 to 20 carbon atoms. The alkyl groups can be linear, branched, cyclic, or a combination thereof (e.g., it can have a linear or branched group as well as a cyclic group) depending on the number of carbon atoms.

Copolymers formed from a second monomer composition that includes both a fluorinated monomer of Formula (X) and an alkyl (meth)acrylate monomer of Formula (XI) often contain at least 30 weight percent of the monomer of Formula (X). For example, the second monomer composition contains at least 35 weight percent, at least 40 weight percent, or at least 50 weight percent and up to 99 weight percent, up to 95 weight percent, up to 90 weight percent, up to 80 weight percent, up to 70 weight percent, or up to 60 weight percent of the fluorinated monomer of Formula (X). In some of these examples, the only other monomers in the second monomer composition are alkyl (meth)acrylates of Formula (XI). That is, the second monomer composition includes, for example, 30 to 99 weight percent fluorinated monomer of Formula (X) and 1 to 70 weight percent monomer of Formula (XI), 30 to 90 weight percent fluorinated monomer of Formula (X) and 10 to 70 weight percent alkyl (meth)acrylate of Formula (XI), 30 to 80 weight percent fluorinated monomer of Formula (X) and 20 to 70 weight percent alkyl (meth)acrylate of Formula (XI), 50 to 99 weight percent fluorinated monomer of Formula (X) and 1 to 50 weight percent alkyl (meth)acrylate of Formula (XI). The weight percent amounts are based on the total weight of monomers in the second monomer composition.

The second monomer compositions containing the fluorinated monomer of Formula (X) (such as those of Formula (X-1) or (X-2)) can optionally include a polar monomer such as (meth)acrylic acid. The polar monomer may facilitate adhesion of the fluorinated coating layer to the porous polymeric core particle. If (meth)acrylic acid is included in the second monomer composition, its concentration is typically no greater than 5 weight percent based on a total weight of the monomers in the second monomer composition. For example, the amount can be at least 0.5 weight percent, at least 1 weight percent, at least 1.5 weight percent, or at least 2 weight percent and can be up to 5 weight percent, up to 4 weight percent, or up to 3 weight percent. If used in higher amounts, the resulting fluorinated copolymer may not be sufficiently hydrophobic. That is, the second monomer composition contains 0.5 to 5 weight percent polar monomer such as (meth)acrylic acid and 95 to 99.5 weight percent fluorinated monomer of Formula (X).

In some embodiments, the second monomer composition can include 30 to 100 weight percent fluorinated monomer of Formula (X), 0 to 70 weight percent alkyl (meth)acrylate of Formula (XI), and 0 to 5 weight percent (meth)acrylic acid. Such monomer compositions often contain 30 to 99 weight percent fluorinated monomer of Formula (X), 1 to 70 weight percent alkyl (meth)acrylate of Formula (XI) and 0.5 to 5 weight percent (meth)acrylic acid. For example, the second monomer composition can include 30 to 70 weight percent fluorinated monomer of Formula (X), 30 to 70 weight percent alkyl (meth)acrylate of Formula (XI), and 0.5 to 5 weight percent (meth)acrylic acid or 50 to 95 weight percent fluorinated monomer of Formula (X), 1 to 50 weight percent alkyl (meth)acrylate of Formula (XI), and 0.5 to 5 weight percent (meth)acrylic acid.

In some applications, the second monomer composition includes a monomeric dye having a (meth)acryloyl group and ring structure having multiple aromatic rings. The ring structure is often fluorescent. Such monomers may be helpful in determining whether or not the fluorinated polymer is surrounding the loaded porous polymeric core particle. Example monomeric dyes include, but are not limited to the following compounds of Formula (XII) to (XV) that are further described more fully in U.S. Pat. No. 6,894,105 B2 (Parent et al.). The variable m in these formulas is at least 1, at least 2, at least 3, at least 4, or at least 5 and can be up to 15, up to 10, or up to 8. The variable m is often in a range of 1 to 15, 1 to 10, 1 to 8, 2 to 8, or 4 to 8.

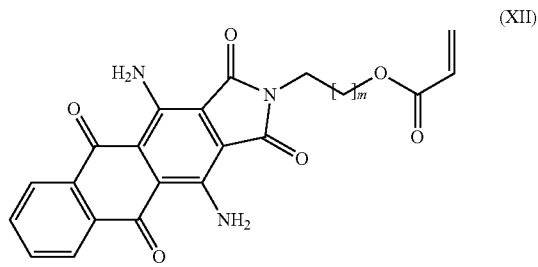

(XII)

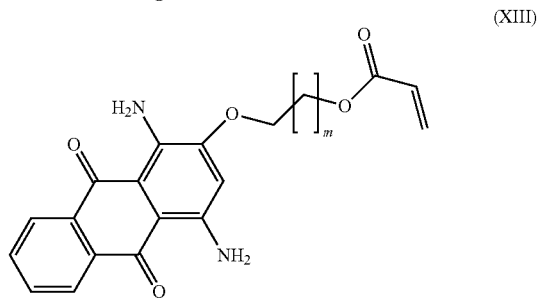

(XIII)

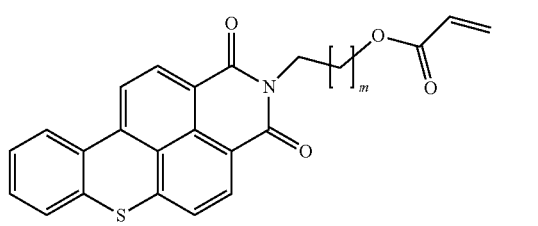

(XIV)

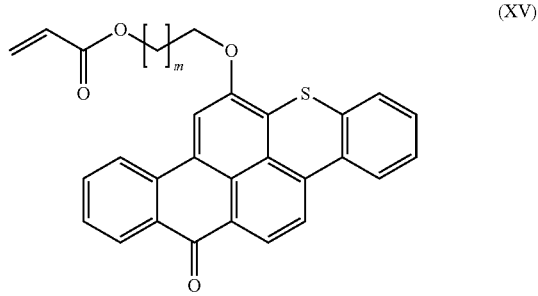

(XV)

If a dye monomer is included in the monomer composition, it is typically used in an amount equal to at least 0.001 weight percent, at least 0.005 weight percent, at least 0.01 weight percent, at least 0.05 weight percent, at least 0.1 weight percent, or at least 0.5 weight percent and can be used in an amount up to 3 weight percent, up to 2 weight percent, or up to 1 weight percent. The amount is based on a total weight of monomers in the second monomer composition.

The fluorinated polymer is formed from the second monomer composition in the presence of an initiator for a free radical polymerization reaction. The same types of initiators and the amount of initiators discussed above for preparation of the porous polymeric core particle can be used to form the fluorinated polymer.

The polymerization reaction to form the fluorinated polymeric material is often carried out in the presence of an organic solvent. Examples of suitable solvents include, for example, aliphatic and alicyclic hydrocarbon solvents (e.g., hexane, heptane, and cyclohexane), aromatic solvents (e.g., benzene, toluene, and xylene), ethers (e.g., diethyl ether, dimethoxyethane, bis(2-methoxyethyl)ether, and diisopropyl ether), esters (e.g., ethyl acetate and butyl acetate), alcohols (e.g., ethanol and isopropanol), ketones (e.g., acetone, methyl ethyl ketone and methyl isobutyl ketone), sulfoxides (e.g., dimethyl sulfoxide), amides (e.g., N,N-dimethylformamide and N,N-dimethylacetamide), halogenated solvents (e.g., methylchloroform, 1,1,2-trichloro-1,2,2-trifluoroethane, trichloromethane, and trifluorotoluene), and mixtures thereof. In some embodiments an ester solvent such as ethyl acetate or butyl acetate is used.

The molecular weight of the fluorinated polymer can be selected and/or controlled based on the concentration and activity of the initiator, the concentration of the monomers in the reaction mixture, and the amount and choice of organic solvent. The weight average molecular weight is often at least 5,000 Daltons (Da), at least 10,000 Da, or at least 15,000 Da and can be up to 100,000 Da or more, up to 80,000 Da, up to 60,000 Da, or up to 50,000 Da. If the molecular weight is too high, it may be difficult to dissolve the fluorinated polymer in an appropriate solvent system (e.g., a fluorinated solvent) to provide a coating solution.

The fluorinated polymer is typically dissolved in a suitable solvent to provide a coating solution that is mixed with the loaded porous polymeric core particles. The composition of the coating solution is usually selected so that a significant amount of the curing agent and/or curing catalyst is not extracted out of the loaded polymeric core particle during the deposition of the coating layer. The curing agent and/or curing catalyst are often relatively polar compared to the coating solution. Thus, the curing agent and/or curing catalyst are typically either not extracted or extracted to a minimal extent from the porous polymeric core particle during the process of depositing the coating layer. In some embodiments, the coating solution extracts less than 10 weight percent, less than 5 weight percent, less than 3 weight percent, less than 2 weight percent, less than 1 weight percent, or less than 0.5 weight percent of the curing agent and/or curing catalyst from the loaded polymeric core particle.

In some embodiments, the coating solution used to form the coating layer contains the fluorinated polymer dissolved in a fluorinated solvent. The fluorinated solvent is usually a hydrofluoroether of Formula (XVI).

(R$^{14}$—O)$_2$-Rf$^1$     (XVI)

In Formula (XVI), the group R$^{14}$ is an alkyl, the variable z is 1 to 2, and Rf$^1$ is a perfluoroalkyl group (when z is equal to 1) or a perfluoroalkylene (when z is equal to 2). Each of the perfluoroalkyl or perfluoroalkylene Rf$^1$ group and the alkyl R$^{14}$ groups usually has 1 to 10 carbon atoms, 1 to 6 carbon atoms, 1 to 4 carbon atoms.

Some example fluorinated solvents are n-C$_4$F$_9$OCH$_3$, n-C$_4$F$_9$OCH$_2$CH$_3$, CF$_3$CF(CF$_3$)CF$_2$OCH$_3$, CF$_3$CF(CF$_3$)CF$_2$OCH$_2$CH$_3$, C$_8$F$_{17}$OCH$_3$, CH$_3$O—(CF$_2$)$_4$—OCH$_3$, and C$_5$F$_{11}$OC$_2$H$_5$, (CF$_3$)$_2$CFOCH$_3$, CF$_3$—CF(CF$_3$)—CF (OC$_2$H$_5$)—CF$_2$CF$_2$CF$_3$, CF$_3$-c[N(CF$_2$CF$_2$)$_2$O], and (CF$_3$)$_2$CF-c[N(CF$_2$CF$_2$)$_2$O] wherein -c[N(CF$_2$CF$_2$)$_2$O] is a cyclic group. Fluorinated solvents are commercially available under the trade designation NOVEC from 3M Company (Saint Paul, Minn., USA). These include NOVEC 7100 (which is C$_4$F$_9$—OCH$_3$), NOVEC 7200 (which is C$_4$F$_9$OCH$_2$CH$_3$), and NOVEC 7500 (which is CF$_3$—CF (CF$_3$)—CF(OC$_2$H$_5$)—CF$_2$CF$_2$CF$_3$).

Typically, the only solvent included in the coating solution is the fluorinated solvent. However, other non-fluorinated solvents that are miscible with the fluorinated solvent can be included. For example, the coating solution can include ethyl acetate and propylene glycol methyl ether acetate, which is commercially available under the trade designation DOWANOL PMA from Dow Chemical (Midland, Mich., USA). Usually, the non-fluorinated solvent is included in an amount in a range of 0 to 10 weight percent, 0 to 8 weight percent, 1 to 10 weight percent, 1 to 8 weight percent, 2 to 10 weight percent, or 2 to 8 weight percent based on the total weight of fluorinated and non-fluorinated solvent. In many embodiments, the solvent in the coating solution is 100 percent fluorinated solvent.

The amount of fluorinated polymer in the coating solution depends on its solubility in the fluorinated solvent, the desired viscosity of the coating solution, and the desired thickness of the coating layer. The coating solution often contains at least 5 weight percent, at least 10 weight percent, at least 15 weight percent, or at least 20 weight percent solids. The weight percent solids corresponds to the weight percent fluorinated polymer in the coating solution. The weight percent solids can be up to 70 weight percent or even higher, up to 60 weight percent, up to 50 weight percent, up to 40 weight percent, or up to 30 weight percent. For example, the weight percent solids can be in a range of 10 to 70 weight percent, in a range of 20 to 60 weight percent, in a range of 20 to 50 weight percent, or in a range of 20 to 40 weight percent.

In many embodiments, the maximum percent solids often corresponds to the coating solution having the highest viscosity that can be pumped. High solids can be desirable because less solvent needs to be removed during the process of forming the coating layer. If the percent solids value is too high, however, it is more likely that the coating layer will surround multiple loaded polymeric core particles. In many embodiments, dilute coating solutions are used to increase the likelihood of forming composite particles containing a single loaded polymeric core particle.

Any suitable method can be used to deposit the coating around the polymeric core particle. In most embodiments, the polymeric core particles contain loaded curing agent and/or loaded curing catalyst at the time the coating layer is deposited. That is, the coating layer is formed around loaded polymeric core particles. The coating solution is mixed with the loaded polymeric core particles. After sufficient mixing, the solvent is removed to provide a coating layer around the loaded polymeric core particles.

In some embodiments, the coating layer around the polymeric core particle is formed by spray drying (spray coating and drying) or similar processes such as fluidized bed coating and drying that can result in the formation of a coating layer with relatively uniform thickness around the loaded polymeric core particles is often considered to be preferable. If conditions are selected appropriately, these processes can be used to provide composite particles having a single rather than multiple loaded polymeric core particles. That is, the composite particles have a core-shell arrangement with a coating layer around a single loaded polymeric core particle.

With spray drying, the loaded polymeric core particles are mixed with the coating solution to form a slurry. This slurry is then pumped to a drying chamber that contains an atomizer (to form droplets) and a drying gas. Some common types of atomization include rotary wheel (centrifugal) atomization, single-fluid/pressure nozzle (hydraulic) atomization, two-fluid nozzle (pneumatic) atomization, and ultrasonic atomization. The product, which is the dried composite particles, can be collected by various means such as by gravity or by using a cyclone, filter and bag, electrostatic separation, or the like.

Although any suitable atomization process can be used, two-fluid nozzle atomizers are often used. With these atomizers, a primary fluid (e.g., the slurry) is pumped through a small orifice and a second fluid, which is typically air or nitrogen, is supplied near the small orifice to further atomize the primary fluid. Increasing the ratio of the secondary fluid to the primary fluid usually decreases the slurry droplet size and increases the likelihood of having a single loaded particle within the coating layer.

The two-fluid system may have either internal mixing (the second fluid is introduced into the primary fluid before exiting the final orifice) or external mixing (the second fluid is introduced after the primary fluid exits the final orifice). Multiple different configurations can be used for introducing the second fluid relative to the primary fluid. For example, the configuration can be a round spray (concentric ring of the second fluid surrounding the primary fluid orifice), conical/hollow spray, angle/flat spray, swirl spray, or the like. Atomizers with these different configurations are available from various suppliers such as Spraying Systems Co. (Wheaton, Ill., USA).

Numerous options can be used for the flow of the bulk drying gas into and out of the drying chamber. To maintain sufficient thermal energy and to provide a drying gas with sufficient drying capacity (e.g., low dew point), the drying gas is usually continuously cycled through the drying chamber. The main classes of flow patterns of the drying gas relative to the atomized droplets (input material) are co-current flow, counter-current flow, and mixed flow. Co-current flow involves the input material traveling in the same direction as the bulk drying gas; this is often embodied as input material travelling downward immediately after atomization (e.g., being sprayed downward) along with the downward-travelling bulk drying gas. Co-current is usually good for temperature-sensitive systems because the hot drying gas is cooled by the drying droplets, so the solid materials never experience the temperature of the hot incoming drying gas. Counter-current flow involves the input material travelling in the opposite direction to the bulk drying gas; this is often embodied as input material travelling downward immediately after atomization (e.g., being sprayed downward) while the bulk drying gas is travelling upward. This flow is often used for the most efficient drying. Mixed flow is a combination of co- and counter-current flow, where the input material is travelling in the same direction as the bulk drying gas in some regions, but in the opposite direction in other regions. Most often this flow pattern is seen when the input material is being atomized in an upward direction, where the input material initially travels upward from the energy imparted on it by atomization, but is subsequently pulled downward by gravity. Because the input material travels in two directions, the bulk drying gas will travel with the input material in some places and against the input material in others, regardless of whether the bulk drying gas is traveling downward or upward. Mixed flow can be advantageous because of the higher residence times in the drying chamber it provides to the drying solids.

The drying temperature is usually selected based on the composition of the loaded polymeric core particles and the coating solution. In many embodiments, the bulk drying gas at the outlet of the drying chamber has a temperature near the boiling point of the solvent used in the slurry (in the coating solution) to ensure that adequate drying occurs. This does result, however, in the dried solids reaching a temperature that is near the boiling point of the solvent. In most instances, this can be beneficial because it minimizes residual liquids, which can lead to improved ability to flow, reduced hazards from volatile organic solvents being present, and reduction of unnecessary mass.

For some composite particles, however, it may be undesirable to use such a high drying temperature. This can be the situation, for example, where any component of the composite particles has a glass transition temperature, melting temperature, or decomposition temperature near the boiling point of the solvent contained in the slurry. In particular, care must be taken to prevent or minimize release of the curing agent and/or curing catalyst from the composite particle. In such a situation, the drying temperature is typically reduced below that where any undesirable alteration of the composite particle can occur. Drying can be accomplished at lower temperatures, for example, by increasing the residence time in the drying chamber, increasing the flow rate of the drying gas, decreasing the evaporative load, or modifying the various flow patterns.

Multiple coating layers can be positioned around the loaded polymeric core particles. Often, multiple layers are added to provide a thicker coating layer or to alter the release characteristics of the curing agent and/or curing catalyst from the porous composite particle. If multiple coating layers are used, they are usually selected to be compatible with each other. In many embodiments, the same fluorinated polymer is used to form the multiple coating layers.

The coating layer can have any desired thickness. In some embodiments, the thickness is at least 0.1 micrometer, at least 0.2 micrometer, at least 0.5 micrometer, at least 0.75 micrometer, or at least 1.0 micrometer. The thickness can be up to 5 micrometers or more, up to 4 micrometers, up to 3 micrometers, or up to 2 micrometers. The release profile of the curing agent and/or curing catalyst within the composite particle usually can be controlled by the thickness of the coating layer. That is, the greater the thickness, the slower the release rate of the curing agent and/or curing catalyst through the coating layer. On the other hand, the release rate of the curing agent and/or curing catalyst can be increased by decreasing the coating layer thickness. The thickness is frequently in a range of 0.1 to 5 micrometers, in a range of 0.1 to 3 micrometers, in a range of 0.5 to 5 micrometers, in a range of 0.5 to 3 micrometers, in a range of 1 to 5 micrometers, in a range of 1 to 3 micrometers, in a range of 0.1 to 2 micrometers, in a range of 0.5 to 2 micrometers, or in a range of 1 to 2 micrometers.

The desired thickness of the coating layer can be used to calculate the theoretical weight of the fluorinated polymer that should be deposited on the loaded polymeric core particles to provide that thickness. More specifically, the mass of the shell can be calculated using Equation (1).

$$m_{shell}=m_p(\rho_{shell}/\rho_p)[(D_{tot})^3/(D_p)^3-1] \qquad (1)$$

where $m_{shell}$ is the mass of the shell (i.e., coating layer) in grams, $m_p$ is the mass of the loaded polymeric core particle in grams, $\rho_{shell}$ is the density of the shell in grams per cubic centimeter, $\rho_p$ is the density of core particle in grams per cubic centimeter, $D_{tot}$ is the diameter of the composite the loaded polymeric particle in centimeters, and $D_p$ is the diameter of the polymeric core particle (e.g., loaded polymeric core particle) in centimeters. The diameter $D_p$ can be determined using any of a variety of methods such as measuring the diameter of particles in an electron micrograph. The diameter $D_{tot}$ is equal to $D_p$ plus the desired shell thickness. The density of the loaded polymeric core particles is often about 0.5 $cm^3$/gram but can be measured using procedures known to those of skill in the art. The density of the shell is that of the fluorinated polymer included in the coating solution. Alternatively, equation (1) can be used to calculate the theoretical thickness of the coating layer (i.e., shell) based on the total mass of the fluorinated polymer included in the coating solution.

As an alternative to spray drying or similar processes, a mixture of loaded polymeric core particles and the coating solution can be spread out into a thin layer for drying purposes. Any suitable drying method can be used. The dried layer can then be broken apart to provide the composite particles. For example, the dried layer can be placed within a blender or dry mill to separate the particles from each other. The percent solids in the thin layer are typically relatively low to decrease the likelihood of having multiple loaded polymeric core particles within the same porous composite particle. This method can be used when relatively uniform coating layer thicknesses are not necessary or where a variety of coating thicknesses may be desired to provide a wider distribution of release rates for the curing agent and/or curing catalyst. Additionally, this method can be used when it may be beneficial to have multiple loaded polymeric core particles surrounded by the same coating layer to provide a distribution of release rates.

The composite particle typically contains at least 20 weight percent porous polymeric core particle, at least 0.1 weight percent curing agent and/or curing catalyst, and at least 10 weight percent coating layer based on the total weight of the porous composite particle. In some examples, the composite particle can contain at least 30 weight percent porous polymeric core particle, at least 0.5 weight percent curing agent and/or curing catalyst, and at least 20 weight percent coating layer. In other examples, the composite particle can contain at least 40 weight percent porous polymeric core particle, at least 1 weight percent curing agent and/or curing catalyst, and at least 30 weight percent coating layer.

The composite particle typically contains up to 90 weight percent porous polymeric core particle, up to 70 weight percent curing agent and/or curing catalyst, and up to 80 weight percent coating layer. In some example, the composite particle can contain up to 80 weight percent porous polymeric core particle, up to 50 weight percent curing agent and/or curing catalyst, and up to 70 weight percent coating layer. In other examples, the composite particle can contain up to 70 weight percent porous polymeric core particle, up to 40 weight percent curing agent and/or curing catalyst, and up to 60 weight percent coating layer.

In some embodiments, the composite particle contains 20 to 90 weight percent porous polymeric core particle, 1 to 70 weight percent curing agent and/or curing catalyst, and 10 to 80 weight percent coating layer. In some examples, the composite particle contains 30 to 80 weight percent porous polymeric core particle, 1 to 50 weight percent curing agent and/or curing catalyst, and 20 to 70 weight percent coating layer. In other example, the composite particles contain 30 to 75 weight percent porous polymeric core particle, 5 to 50 weight percent curing agent and/or curing catalyst, and 25 to 70 weight percent coating layer. In still other examples, the composite particle contains 30 to 70 weight percent porous polymeric core particle, 5 to 40 weight percent curing agent and/or curing catalyst, and 30 to 70 weight percent coating layer.

For many embodiments of the resulting composite particles, the coating layer surrounds the loaded porous polymeric core particle as a shell layer. Stated differently, the composite particles are core-shell polymeric core particles. The coating layer encapsulates the curing agent and/or curing catalyst within the porous polymeric core particle (i.e., the coating layer encapsulates the loaded polymeric core particles). Prior to release of the curing agent and/or curing catalyst, the porous composite particles have a core-shell structure with the porous polymeric core particles containing the loaded curing agent and/or curing catalyst. In some embodiments, the shell layer (coating layer) surrounds a single porous polymeric core particle. That is, the composite particle contains a single loaded polymeric core particle. In other embodiments, however, the shell surrounds multiple loaded polymeric core particles. That is, the composite particle contains multiple loaded polymeric core particles within a common shell layer (coating layer).

In many embodiments, the loaded polymeric core particles are not tacky. This increases the likelihood that multiple loaded polymeric core particles will not adhere together before or during application of the coating layer. The lack of tackiness of the loaded polymeric core particles increases the likelihood that the coating layer will be positioned around a single polymeric core particle rather than around multiple loaded polymeric core particles.

In another aspect, a curable composition is provided. The curable composition contains (1) an epoxy resin and (2) a composite particle mixed with the epoxy resin. As described above, the composite particle contains (a) a porous polymeric core particle, (b) a curing agent and/or curing catalyst for an epoxy resin positioned within the porous polymeric core particle but not covalently bound to the porous polymeric core particle, and (c) a coating layer around the porous polymeric core particle, wherein the coating layer comprises a fluorinated polymer.

The composite particles are mixed with the epoxy resin. While any suitable amount of the composite particles can be combined with the epoxy resin, the amount is typically dependent on the amount and type of curing agent and/or curing catalyst loaded into the composite particle. For example, larger amounts of the curing agent (particularly if the curing agent is a compound having at least two groups of formula —$NR^7H$) than if a curing catalyst is used. Compounds having at least two groups of formula —$NR^7H$ tend to react directly with the epoxy resin while the curing catalysts, as the name implies, function as catalysts for the ring opening reactions of the oxirane groups.

In many embodiments, the amount of composite particles included in the curable composition is at least 0.1 weight percent based on the combined weight of the composite particles and the epoxy resin. If lower amounts are used, there may be an insufficient amount of the curing agent and/or curing catalyst to polymerize the epoxy resin. The amount of the composite particles can be, for example, at least 0.5 weight percent, at least 1 weight percent, at least 2 weight percent, or at least 5 weight percent. The amount of the composite particles can be up to 35 weight percent. If the amount of the composite particles is higher, the final cured composition may be too soft (it may have lower than the desired amount of strength integrity). The amount of the composite particles can be, for example, up to 30 weight percent, up to 25 weight percent, up to 20 weight percent, up to 15 weight percent, or up to 10 weight percent. In some example embodiments, the amount is in a range of 0.1 to 35 weight percent, in a range of 0.5 to 35 weight percent, in a range of 0.5 to 30 weight percent, in a range of 0.5 to 25 weight percent, in a range of 0.5 to 20 weight percent, in a range of 0.5 to 10 weight percent, in a range of 1 to 30 weight percent, in a range of 1 to 20 weight percent, or in a range of 1 to 10 weight percent. The weight percent values are based on the total weight of the cured composition.

The composite particle is typically heated in the presence of the epoxy resin to release the curing agent and/or curing catalyst. To be released from the polymeric core particle within the composite particle, the curing agent and/or curing catalyst typically diffuses through the coating layer positioned around the loaded polymeric core particle. Diffusion may occur, for example, through an opening or void within the polymeric matrix of the coating layer, through defects in the coating layer, or by any other mechanism. The thickness and composition of the coating layer as well as the environment surrounding the composite particle can affect the rate of diffusion of the curing agent and/or curing catalyst out of the loaded polymeric core particle and through the coating layer.

Depending on the environment and other factors, the release may or may not occur immediately upon heating. That is, the onset of release of the curing agent and/or curing catalyst may commence immediately or after a certain period of time. Once release commences, however, the amount of the curing agent and/or curing catalyst released is usually greatest initially and then decreases over time. Such a release profile can arise when the curing agent and/or curing catalyst is more concentrated at the outer edge of the loaded polymeric core particle. Such a release profile can also arise when the curing agent and/or curing catalyst is distributed uniformly throughout the loaded polymeric core particle because additional time is needed to diffuse from the inner regions of the loaded polymeric core particle.

The epoxy resin that is included in the curable epoxy resin composition contains at least one epoxy functional group (i.e., oxirane group) per molecule. As used herein, the term oxirane group refers to the following divalent group.

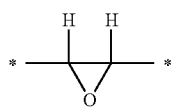

The asterisks denote a site of attachment of the oxirane group to another group. If the oxirane group is at the terminal position of the epoxy resin, the oxirane group is typically bonded to a hydrogen atom.

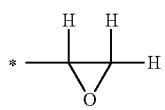

This terminal oxirane group is often part of a glycidyl group.

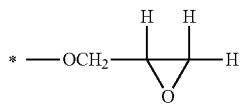

The epoxy resin has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 Daltons, at least 150 Daltons, at least 175 Daltons, at least 200 Daltons, at least 250 Daltons, or at least 300 Daltons. The weight average molecular weight can be up to 50,000 Daltons or even higher for polymeric epoxy resins. The weight average molecular weight is often up to 40,000 Daltons, up to 20,000 Daltons, up to 10,000 Daltons, up to 5,000 Daltons, up to 3,000 Daltons, or up to 1,000 Daltons. For example, the weight average molecular weight can be in the range of 100 to 50,000 Daltons, in the range of 100 to 20,000 Daltons, in the range of 100 to 10,000 Daltons, in the range of 100 to 5,000 Daltons, in the range of 200 to 5,000 Daltons, in the range of 100 to 2,000 Daltons, in the range of 200 to 2,000 Daltons, in the range of 100 to 1,000 Daltons, or in the range of 200 to 1,000 Daltons.

Suitable epoxy resins are typically a liquid at room temperature (e.g., about 20° C. to about 25° C. or about 20° C. to about 30° C.). However, epoxy resins that can be dissolved in a suitable organic solvent also can be used. In most embodiments, the epoxy resin is a glycidyl ether. Exemplary glycidyl ethers can be of Formula (XVII).

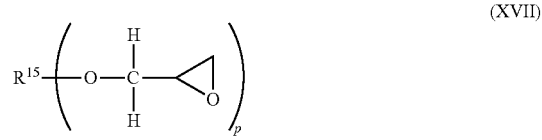

(XVII)

In Formula (XVII), group $R^{15}$ is a p-valent group that is aromatic, aliphatic, or a combination thereof. Group $R^{15}$ can be linear, branched, cyclic, or a combination thereof. Group $R^{15}$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 1, p is often an integer in the range of 2 to 10, in the range of 2 to 6, or in the range of 2 to 4.

In some exemplary epoxy resins of Formula (XVII), the variable p is equal to 2 (i.e., the epoxy resin is a diglycidyl ether) and $R^{15}$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene or biphenylene. Group $R^{15}$ can optionally further include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (XVII) are diglycidyl ethers where $R^{15}$ includes (a) an arylene group or (b) an arylene group in combination with an alkylene, heteroalkylene, or both. Group $R^{15}$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (XVII) are derived from bisphenol A (i.e., bisphenol A is 4,4'-dihydroxydiphenylmethane). Examples include, but are not limited to, those available under the trade designation EPON (e.g., EPON 828, EPON 872, EPON 1001, EPON 1004, EPON 2004, EPON 1510, and EPON 1310) from Hexion Inc., in Columbus, Ohio, USA, those available under the trade designation DER (e.g., DER 331, DER 332, DER 336, and DER 439) from Dow Chemical Co., in Midland, Mich., USA and those available under the trade designation EPICLON (e.g., EPICLON 850) from Dainippon Ink and Chemicals, Inc., in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co., those available under the trade designation EPICLON (e.g., EPICLON 830) from Dainippon Ink and Chemicals, Inc., in Parsippany, N.J., USA, and those available under the trade designation ARALDITE (e.g., ARALDITE GY 281) from Huntsman Corporation in The Woodlands, Tex., USA.

Other epoxy resins of Formula (XVII) are diglycidyl ethers of a poly(alkylene oxide) diol. These epoxy resins also can be referred to as diglycidyl ethers of a poly(alkylene glycol) diol. The variable p is equal to 2 and $R^{15}$ is a heteroalkylene having oxygen heteroatoms. The poly(alkylene glycol) portion can be a copolymer or homopolymer and often includes alkylene units having 1 to 4 carbon atoms. Examples include, but are not limited to, diglycidyl ethers of poly(ethylene oxide) diol, diglycidyl ethers of poly(propylene oxide) diol, and diglycidyl ethers of poly (tetramethylene oxide) diol. Epoxy resins of this type are commercially available from Polysciences, Inc., in Warrington, Pa., USA such as those derived from a poly(ethylene oxide) diol or from a poly(propylene oxide) diol having a weight average molecular weight of about 400 Daltons, about 600 Daltons, or about 1000 Daltons.

Still other epoxy resins of Formula (XVII) are diglycidyl ethers of an alkane diol ($R^{15}$ is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion, Inc. (Columbus, Ohio, USA) and under the trade designation EPALLOY (e.g., EPALLOY 5001) from CVC Thermoset Specialties (Moorestown, N.J., USA).

For some applications, the epoxy resins chosen for use in the curable coating compositions are novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation in The Woodlands, Tex., USA, under the trade designation EPALLOY (e.g., EPALLOY 8230) from CVC Thermoset Specialties in Moorestown, N.J., USA, and under the trade designation DEN (e.g., DEN 424 and DEN 431) from Dow Chemical in Midland, Mich., USA.

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co., in Midland, Mich., USA under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin composition and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER (e.g., HELOXY MODIFIER 107) from Hexion Inc., in Columbus, Ohio, USA, and under the trade designation EPODIL (e.g., EPODIL 757) from Air Products and Chemicals, Inc., in Allentown, Pa., USA. Other reactive diluents have only one functional group (i.e., oxirane group) such as various monoglycidyl ethers. Some example monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some monoglycidyl ethers that are commercially available include those under the trade designation EPODIL from Air Products and Chemicals, Inc., in Allentown, Pa., USA such as EPODIL 746 (2-ethylhexyl glycidyl ether), EPODIL 747 (aliphatic glycidyl ether), and EPODIL 748 (aliphatic glycidyl ether).

Still other epoxy resins are designed to reduce amine blushing. These epoxy resins are usually added into the curable coating compositions at relatively low levels. Such an epoxy resin is commercially available under the trade designation DW 1765 from Huntsman Corporation, The Woodlands, Tex., USA. This material has a paste-like consistency but is based on a liquid epoxy resin.

The curable coating composition typically includes at least 20 weight percent epoxy resin based on a total weight of the curable coating composition. If lower levels are used, the cured coating composition may not contain enough polymeric material (e.g., epoxy resin) to provide the desired coating characteristics. Some curable coating composition can include at least 25 weight percent, at least 30 weight percent, at least 40 weight percent, or at least 50 weight percent epoxy resin. The curable coating composition often includes up to 90 weight percent, up to 85 weight percent, up to 80 weight percent epoxy resin but higher amounts could be used if no fillers are added. For example, the curable coating composition can include up to 75 weight percent, up to 70 weight percent, up to 65 weight percent, or up to 60 weight percent epoxy resin. Some examples of curable coating compositions contain 20 to 90 weight percent, 20 to 80 weight percent, 20 to 70 weight percent, 30 to 90 weight percent, 30 to 80 weight percent, 30 to 70 weight percent, 30 to 60 weight percent, 40 to 90 weight percent, 40 to 80 weight percent, 40 to 70 weight percent, 40 to 60 weight percent, 50 to 90 weight percent, 50 to 80 weight percent, or 50 to 70 weight percent epoxy resin.

In addition to the epoxy resin and the composite particles, the curable composition can include various optional components. One such optional component is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured composition.

Some polymeric toughening agents that have both a rubbery phase and a thermoplastic phase are acrylic core-shell polymers wherein the core is an acrylic copolymer having a glass transition temperature below about 0° C. Such core polymers may include polybutyl acrylate, polyisooctyl acrylate, polybutadiene-polystyrene in a shell comprised of an acrylic polymer having a glass transition temperature above about 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a pre-dispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan).

Another class of polymeric toughening agents are carboxyl-terminated butadiene acrylonitrile compounds such as those available under the trade designations HYCAR (e.g., HYCAR 1300X8, HYCAR 1300X13, and HYCAR 1300X17) from Lubrizol Advanced Materials, Inc. (Cleveland, Ohio, USA) and under the trade designation PARALOID (e.g., PARALOID EXL-2650) from Dow Chemical (Midland, Mich., USA).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from about 95 percent to about 40 percent by weight of the total graft polymer, so that the polymerized thermoplastic portion constitutes from about 5 percent to about 60 percent by weight of the graft polymer.

Still other polymeric toughening agents are polyether sulfones such as those commercially available from BASF (Florham Park, N.J., USA) under the trade designation ULTRASON (e.g., ULTRASON E 2020 P SR MICRO).

The curable composition can additionally contain a non-reactive plasticizer to modify rheological properties. Commercially available plasticizers include those available under the trade designation BENZOFLEX 131 from Eastman Chemical (Kingsport, Tenn., USA), JAYFLEX DINA available from ExxonMobil Chemical (Houston, Tex., USA), and PLASTOMOLL (e.g., diisononyl adipate) from BASF (Florham Park, N.J., USA).

The curable composition optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corporation (Alpharetta, Ga., USA).

In some embodiments, the curable composition optimally contains adhesion promoters to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, Ga., USA). Particulate fillers can be in the form of flakes, rods, spheres, and the like. Additives are typically added in amounts to produce the desired effect in the resulting adhesive.

In another aspect, a cured composition is provided. The cured composition is a reaction product of the curable composition described above. That is, the cured composition contains the reaction product (polymerized product) of a curable composition that contains an epoxy resin and a composite particle mixed with the epoxy resin. The composite particle contains 1) a porous polymeric core particle, 2) a curing agent and/or curing catalyst for the epoxy resin that is positioned within the porous polymeric core particle but not chemically bound to the porous polymeric core particle, and 3) a coating layer around the porous polymeric core particle, wherein the coating layer comprises a fluorinated polymer. Any of the above described curable compositions can be used to prepare the cured compositions.

In yet another aspect, an article is provided that includes a cured composition positioned between a first substrate and a second substrate. The cured composition is formed from any of the curable compositions described above. The cured composition is adhered to both the first substrate and the second substrate.

The cured composition is formed by reaction (i.e., polymerization or curing) of the curable composition. In many embodiments, the curable composition is positioned between two substrates and then heated to cause diffusion of the curing agent and/or curing catalyst from the composite particle. Upon diffusion from the composite particle, the curing agent and/or curing catalyst contacts the epoxy resin in the curable composition. If the conditions are suitable for reaction, a cured composition is formed. Conditions suitable for reaction include, for example, having a sufficient concentration of curing agent and/or curing catalyst mixed with the epoxy resin and having a sufficient temperature for curing the epoxy resin.

Substrates can be selected from various materials depending on the application. Materials useful for substrates include, but are not limited to, metals, ceramics, glasses, composite materials, polymeric materials, and the like. Metals useful as substrates include, but are not limited to, aluminum and steel, such as high strength steel, stainless steel, galvanized steel, cold-rolled steel, and surface-treated metals. Surface treatments include, but are not limited to, paints, oil draw lubricants or stamping lubricants, electrocoats, powder coats, primers, chemical and physical surface treatments, and the like. Composites useful as substrates in the present disclosure include, but are not limited to, glass reinforced composites and carbon reinforced composites. Polymeric materials useful as substrates in the present disclosure include, but are not limited to nylon, polycarbonate, polyester, (meth)acrylate polymers and copolymers, acrylonitrile-butadiene-styrene copolymers, and the like.

In yet another aspect, a method of forming a cured composition is provided. The method includes providing a curable composition, heating the curable composition to release the curing agent and/or curing catalyst from the composite particle, and forming a cured composition by reacting the curing agent and/or curing catalyst with the epoxy resin. The curable compositions are the same as described above and include an epoxy resin and a composite particle mixed with the epoxy resin. The composite particle contains 1) a porous polymeric core particle, 2) a curing agent and/or curing catalyst for the epoxy resin that is positioned within the porous polymeric core particle but not chemically bound to the porous polymeric core particle, and 3) a coating layer around the porous polymeric core particle, wherein the coating layer comprises a fluorinated polymer.

The formation of the composite particle containing the curing agent and/or curing catalyst allows for the preparation of a one part curable composition. That is, all of the components of the curable composition can be mixed together and then heated for reactivity (i.e., formation of the cured composition). The curable composition can be stored for at least 1 day, at least 2 days, at least 3 days, at least 1 week, at least 2 weeks, at least 1 month or more prior to formation of the cured composition. The time of curing often can be selected by controlling the temperature in which the curable composition is stored.

Various embodiments are provided that include a composite particle, a method of making the composite particle, a curable composition containing an epoxy resin and the composite particle, a cured composition comprising a polymerized product of the curable composition, and an article containing the cured composition positioned between two substrates.

Embodiment 1A is a composite particle that includes a) a porous polymeric core particle, b) a curing agent and/or a curing catalyst for an epoxy resin positioned within the porous polymeric core particle but not covalently bound to the porous polymeric core particle, and c) a coating layer around the porous polymeric core particle, wherein the coating layer comprises a fluorinated polymer.

Embodiment 2A is the composite particle of embodiment 1A, wherein the porous polymeric core particle is a cross-linked (meth)acrylate polymeric material.

Embodiment 3A is the composite particle of embodiment 1A or 2A, wherein the porous polymeric core particle is a polymerized product of a first monomer composition comprising a monomer having at least two (meth)acryloyl groups.

Embodiment 4A is the composite particle of any one of embodiments 1A to 3A, wherein the first monomer composition comprises a first monomer of Formula (I)

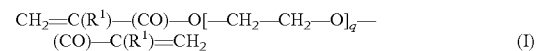

$$CH_2=C(R^1)-(CO)-O[-CH_2-CH_2-O]_q- \\ (CO)-C(R^1)=CH_2 \qquad (I)$$

wherein q is an integer equal to at least 1 and $R^1$ is hydrogen or methyl.

Embodiment 5A is the composite particle of any one of embodiments 1A to 4A, wherein the porous polymeric core particle comprises a polymerized product of a reaction mixture comprising i) a first phase and ii) a second phase dispersed in the first phase, wherein the second phase comprises a first monomer of Formula (I)

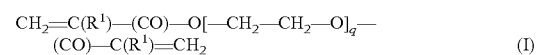

$$CH_2=C(R^1)-(CO)-O[-CH_2-CH_2-O]_q- \\ (CO)-C(R^1)=CH_2 \qquad (I)$$

wherein q is an integer equal to at least 1 and IV is hydrogen or methyl.

Embodiment 6A is the composite particle of embodiment 5A, wherein the first phase comprises water and a polysaccharide dissolved in water.

Embodiment 7A is the composite particle of embodiment 5A, wherein the first phase comprises a nonionic surfactant and a polyol compound of Formula (II)

$$HO[-CH_2-CH(OH)-CH_2-O]_x-H \quad (II)$$

wherein x in an integer equal to at least 1.

Embodiment 8A is the composite particle of any one of embodiments 5A to 7A, wherein the second phase further comprises poly(propylene glycol).

Embodiment 9A is the composite particle of embodiment 8A, wherein the poly(propylene glycol) has a weight average molecular weight of at least 500 Daltons.

Embodiment 10A is the composite particle of embodiment 8A or 9A, wherein the poly(propylene glycol) is removed from the polymerized product to provide the porous polymeric core particle.

Embodiment 11A is the composite particle of any one of embodiments 1A to 10A, wherein the curing agent is a compound having at least two groups of formula —$NR^7$ where $R^7$ is hydrogen, alkyl, aryl, or alkylaryl.

Embodiment 12A is the composite particle of embodiment 11A, wherein $R^7$ is hydrogen or alkyl.

Embodiment 13A is the composite particle of any one of embodiments 1A to 10A, wherein the curing catalyst is an imidazole compound.

Embodiment 14A is the composite particle of any one of embodiments 1A to 10A, wherein curing catalyst is a Lewis acid.

Embodiment 15A is the composite particle of embodiment 14A, wherein the Lewis acid comprises boron trifluoride, boron trichloride, zinc chloride, stannic chloride, antimony pentachloride, antimony pentafluoride, ferric chloride, aluminum trichloride, arsenic pentafluoride, or phosphorous pentafluoride.

Embodiment 16A is the composite particle of embodiment 15A, wherein the Lewis acid is complexed to a hydroxy-containing compound or nitrogen-containing compound.

Embodiment 17A is the composite particle of any one of embodiment 1A to 16A, wherein the fluorinated polymer comprises a polymerized product of a second monomer composition comprising a fluorinated monomer having a (meth)acryloyl group.

Embodiment 18A is the composite particle of embodiment 17A, wherein the fluorinated monomer of Formula (X)

$$Rf-Q-O-(CO)-CR^1=CH_2 \quad (X)$$

wherein $R^1$ is hydrogen or methyl, Rf is an fluorinated alkyl and Q is a divalent linking group. Group Q is not fluorinated. Group Rf can be partially fluorinated or fully fluorinated.

Embodiment 19A is the composite particle of embodiment 18A, wherein Rf has 0 or 1 hydrogen atom.

Embodiment 20A is the composite particle of embodiment 18A or 19A, wherein Q is —$SO_2$—$NR^{11}$—$(CH_2)_k$—, —$(CH_2)_k$—, —$(CH_2)_k$—O—$(CH_2)_k$—, —$(CH_2)_k$—$SO_2$—$(CH_2)_k$—, —$(CH_2)_kSO_2$—$NR^{11}$—$(CH_2)_k$—, —$(CH_2)_k$—S—$(CH_2)_k$—, —(CO)—$NR^{11}$—$(CH_2)_k$—, —$CH_2CH$(OR$^{12}$)—$CH_2$—, —$(CH_2)_kSO_2$—, or —O—(CO)—$NR^{11}$—$(CH_2)_k$—. Group $R^{11}$ is hydrogen, alkyl, or aryl. Group $R^{12}$ is hydrogen or alkyl. The variable k is an integer in a range of 1 to 20.

Embodiment 21A is the composite particle of any one of embodiments 17A to 20A, wherein the monomer of Formula (X) is of Formula (X-1)

$$Rf-(CH_2)_k-O-(CO)-CR^1=CH_2 \quad (X-1)$$

wherein Rf is a fluorinated alkyl, $R^1$ is hydrogen or methyl, and k is an integer in a range of 1 to 20.

Embodiment 22A is the composite particle of any one of embodiments 18A to 20A, wherein the monomer of Formula (X) is of Formula (X-2)

$$Rf-SO_2-NR^{12}-(CH_2)_k-O-(CO)-CR^1=CH_2 \quad (X-2)$$

wherein Rf is a fluorinated alkyl, $R^1$ is hydrogen or methyl, $R^{12}$ is hydrogen, alkyl, or aryl, and k is an integer in a range of 1 to 20.

Embodiment 23A is the composite particle of any one of embodiments 1A to 22A, wherein the composite particle comprises at least 20 weight percent porous polymeric core particle, at least 0.1 weight percent curing agent and/or curing catalyst, and at least 10 weight percent coating layer based on a total weight of the composite particle.

Embodiment 24A is the composite particle of embodiment 23A, wherein the composite particle comprises 20 to 90 weight percent porous polymeric core particle, 1 to 70 weight percent curing agent and/or curing catalyst, and 10 to 80 weight percent coating layer.

Embodiment 25A is the composite particle of any one of embodiments 1A to 24A, wherein the thickness of the coating layer is in a range of 0.1 to 5 micrometers.

Embodiment 1B is a method of making a composite particle. This method includes providing a porous polymeric core particle. The method further includes positioning a curing agent and/or curing catalyst within the porous polymeric core particles to form a loaded porous polymeric core particle in which the curing agent and/or curing catalyst is not covalently bonded to the porous polymeric core particle. The method still further includes providing a fluoropolymer-containing coating layer around the loaded porous polymeric core particle.

Embodiment 2B is the method of embodiment 1B, wherein providing the fluoropolymer-containing coating layer around the loaded porous polymeric core particle comprises 1) forming a slurry comprising the loaded porous polymeric core particles and a coating solution comprising the fluoropolymer and 2) spray drying the slurry.

Embodiment 3B is the method of embodiment 1B or 2B, wherein the coating solution comprises the fluoropolymer dissolved in a fluorinated solvent.

Embodiment 4B is the method of any one of embodiments 1B to 3B, wherein the porous polymeric core particle is a crosslinked (meth)acrylate polymeric material.

Embodiment 5B is the method of any one of embodiments 1B to 4B, wherein the porous polymeric core particle is a polymerized product of a first monomer composition comprising a monomer having at least two (meth)acryloyl groups.

Embodiment 6B is the method of embodiment 5B, wherein the first monomer composition comprises a first monomer of Formula (I)

$$CH_2=C(R^1)-(CO)-O[-CH_2-CH_2-O]_q-\\(CO)-C(R^1)=CH_2 \quad (I)$$

wherein q is an integer equal to at least 1 and IV is hydrogen or methyl.

Embodiment 7B is the method of any one of embodiments 1B to 6B, wherein providing the porous polymeric core particle comprises providing a polymerized product of a reaction mixture comprising i) a first phase and ii) a second phase dispersed in the first phase, wherein the second phase comprises a first monomer of Formula (I)

$$CH_2=C(R^1)-(CO)-O[-CH_2-CH_2-O]_q-(CO)-C(R^1)=CH_2 \quad (I)$$

wherein q is an integer equal to at least 1 and IV is hydrogen or methyl.

Embodiment 8B is the method of embodiment 7B, wherein the first phase comprises water and a polysaccharide dissolved in water.

Embodiment 9B is the method of embodiment 7B, wherein the first phase comprises a nonionic surfactant and a polyol compound of Formula (II)

$$HO[-CH_2-CH(OH)-CH_2-O]_x-H \quad (II)$$

wherein x in an integer equal to at least 1.

Embodiment 10B is the method of embodiment 7B, wherein the second phase further comprises poly(propylene glycol).

Embodiment 11B is the method of embodiment 10B, wherein the poly(propylene glycol) has a weight average molecular weight of of at least 500 Daltons.

Embodiment 12B is the method of embodiment 10B or 11B, wherein the poly(propylene glycol) is removed from the polymerized product to provide the porous polymeric core particle.

Embodiment 13B is the method of any one of embodiment 1B to 12B, wherein the curing agent is a compound having at least two groups of formula —NR$^7$ where R$^7$ is hydrogen, alkyl, aryl, or alkylaryl.

Embodiment 14B is the method of embodiment 13B, wherein R$^7$ is hydrogen or alkyl.

Embodiment 15B is the method of any one of embodiments 1B to 12B, wherein the curing catalyst is an imidazole compound.

Embodiment 16B is the method of any one of embodiments 1B to 12B, wherein curing catalyst is a Lewis acid.

Embodiment 17B is the method of embodiment 16B, wherein the Lewis acid comprises boron trifluoride, boron trichloride, zinc chloride, stannic chloride, antimony pentachloride, antimony pentafluoride, ferric chloride, aluminum trichloride, arsenic pentafluoride, or phosphorous pentafluoride.

Embodiment 18B is the method of embodiment 17B, wherein the Lewis acid is complexed to a hydroxy-containing compound or nitrogen-containing compound.

Embodiment 19B is the method of any one of embodiments 1B to 18B, wherein the fluorinated polymer comprises a polymerized product of a second monomer composition comprising a fluorinated monomer having a (meth)acryloyl group.

Embodiment 20B is the method of any one of embodiments 1B to 19B, wherein the fluorinated polymer comprises a polymerized product of a second monomer composition comprising a monomer of Formula (X)

$$Rf-Q-O-(CO)-CR^1=CH_2 \quad (X)$$

wherein R$^1$ is hydrogen or methyl, Rf is an fluorinated alkyl and Q is a divalent linking group. Group Q is not fluorinated. Group Rf can be partially fluorinated or fully fluorinated.

Embodiment 21B is the method of embodiment 20B, wherein Rf has 0 or 1 hydrogen atom.

Embodiment 22B is the method of embodiment 20B or 21B, wherein Q is —SO$_2$—NR$^{11}$—(CH$_2$)$_k$—, —(CH$_2$)$_k$—, —(CH$_2$)$_k$—O—(CH$_2$)$_k$—, —(CH$_2$)$_k$SO$_2$—(CH$_2$)$_k$—, —(CH$_2$)$_k$SO$_2$—NR$^{11}$—(CH$_2$)$_k$—, —(CH$_2$)$_k$—S— (CH$_2$)$_k$—, —(CO)—NR$^{11}$—(CH$_2$)$_k$—, —CH$_2$CH(OR$^{12}$)—CH$_2$—, —(CH$_2$)$_k$SO$_2$—, or —O—(CO)—NR$^{11}$—(CH$_2$)$_k$—. Group R$^{11}$ is hydrogen, alkyl, or aryl. Group R$^{12}$ is hydrogen or alkyl. The variable k is an integer in a range of 1 to 20.

Embodiment 23B is the method of embodiment 20B or 21B, wherein the monomer of Formula (X) is of Formula (X-1)

$$Rf-(CH_2)_k-O-(CO)-CR^1=CH_2 \quad (X-1)$$

wherein Rf is a fluorinated alkyl, R$^1$ is hydrogen or methyl, and k is an integer in a range of 1 to 20.

Embodiment 24B is the method of embodiment 20B or 21B, wherein the monomer of Formula (X) is of Formula (X-2)

$$Rf-SO_2-NR^{12}-(CH_2)_k-O-(CO)-CR^1=CH_2 \quad (X-2)$$

wherein Rf is a fluorinated alkyl, R$^1$ is hydrogen or methyl, R$^{12}$ is hydrogen, alkyl, or aryl, and k is an integer in a range of 1 to 20.

Embodiment 25B is the method of any one of embodiments 1B to 24B, wherein the composite particle comprises at least 20 weight percent porous polymeric core particle, at least 0.1 weight percent curing agent and/or curing catalyst, and at least 10 weight percent coating layer based on a total weight of the composite particle.

Embodiment 26B is the method of embodiment 25B, wherein the composite particle comprises 20 to 90 weight percent porous polymeric core particle, 1 to 70 weight percent curing agent and/or curing catalyst, and 10 to 80 weight percent coating layer.

Embodiment 27B is the method of any one of embodiments 1B to 26B, wherein the thickness of the coating layer is in a range of 0.1 to 5 micrometers.

Embodiment 1C is a curable composition that contains (1) an epoxy resin and (2) a composite particle mixed with the epoxy resin. The composite particle contains (a) a porous polymeric core particle, (b) a curing agent and/or curing catalyst for the epoxy resin positioned within the porous polymeric core particle but not covalently bound to the porous polymeric core particle, and (c) a coating layer around the porous polymeric core particle, wherein the coating layer comprises a fluorinated polymer.

Embodiment 2C is the curable composition of embodiment 1C, wherein the porous polymeric core particle is a crosslinked (meth)acrylate polymeric material.

Embodiment 3C is the curable composition of embodiment 1C or 2C, wherein the porous polymeric core particle is a polymerized product of a first monomer composition comprising a monomer having at least two (meth)acryloyl groups.

Embodiment 4C is the curable composition of any one of embodiments 1C to 3C, wherein the first monomer composition comprises a first monomer of Formula (I)

$$CH_2=C(R^1)-(CO)-O[-CH_2-CH_2-O]_q-(CO)-C(R^1)=CH_2 \quad (I)$$

wherein q is an integer equal to at least 1 and R$^1$ is hydrogen or methyl.

Embodiment 5C is the curable composition of any one of embodiments 1C to 4C, wherein the porous polymeric core particle comprises a polymerized product of a reaction mixture comprising i) a first phase and ii) a second phase dispersed in the first phase, wherein the second phase comprises a first monomer of Formula (I)

$$CH_2=C(R^1)-(CO)-O[-CH_2-CH_2-O]_q-(CO)-C(R^1)=CH_2 \quad (I)$$

wherein q is an integer equal to at least 1 and IV is hydrogen or methyl.

Embodiment 6C is the curable composition of embodiment 5C, wherein the first phase comprises water and a polysaccharide dissolved in water.

Embodiment 7C is the curable composition of embodiment 5C, wherein the first phase comprises a nonionic surfactant and a polyol compound of Formula (II)

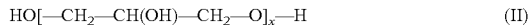

HO[—CH$_2$—CH(OH)—CH$_2$—O]$_x$—H          (II)

wherein x in an integer equal to at least 1.

Embodiment 8C is the curable composition of any one of embodiments 5C to 7C, wherein the second phase further comprises poly(propylene glycol).

Embodiment 9C is the curable composition of embodiment 8C, wherein the poly(propylene glycol) has a weight average molecular weight of at least 500 Daltons.

Embodiment 10C is the curable composition of embodiment 8C or 9C, wherein the poly(propylene glycol) is removed from the polymerized product to provide the porous polymeric core particle.

Embodiment 11C is the curable composition of any one of embodiments 1C to 10C, wherein the curing agent is a compound having at least two groups of formula —NR$^7$ where R$^7$ is hydrogen, alkyl, aryl, or alkylaryl.

Embodiment 12C is the curable composition of embodiment 11C, wherein R$^7$ is hydrogen or alkyl.

Embodiment 13C is the curable composition of any one of embodiments 1C to 10C, wherein the curing catalyst is an imidazole compound.

Embodiment 14C is the curable composition of any one of embodiments 1C to 10C, wherein curing catalyst is a Lewis acid.

Embodiment 15C is the curable composition of embodiment 14C, wherein the Lewis acid comprises boron trifluoride, boron trichloride, zinc chloride, stannic chloride, antimony pentachloride, antimony pentafluoride, ferric chloride, aluminum trichloride, arsenic pentafluoride, or phosphorous pentafluoride.

Embodiment 16C is the curable composition of embodiment 15C, wherein the Lewis acid is complexed to a hydroxy-containing compound or nitrogen-containing compound.

Embodiment 17C is the curable composition of any one of embodiment 1C to 16C, wherein the fluorinated polymer comprises a polymerized product of a second monomer composition comprising a fluorinated monomer having a (meth)acryloyl group.

Embodiment 18C is the curable composition of embodiment 17C, wherein the fluorinated polymer comprises a polymerized product of a second monomer composition comprising a monomer of Formula (X)

Rf-Q-O—(CO)—CR$^1$═CH$_2$          (X)

wherein R$^1$ is hydrogen or methyl, Rf is an fluorinated alkyl and Q is a divalent linking group. Group Q is not fluorinated. Group Rf can be partially fluorinated or fully fluorinated.

Embodiment 19C is the curable composition of embodiment 18C, wherein Rf has 0 or 1 hydrogen atom.

Embodiment 20C is the curable composition of embodiment 18C or 19C, wherein Q is —SO$_2$—NR$^{11}$—(CH$_2$)$_k$—, —(CH$_2$)$_k$—, —(CH$_2$)$_k$—O—(CH$_2$)$_k$—, —(CH$_2$)$_k$—SO$_2$—(CH$_2$)$_k$—, —(CH$_2$)$_k$SO$_2$—NR$^{11}$—(CH$_2$)$_k$—, —(CH$_2$)$_k$—S—(CH$_2$)$_k$—, —(CO)—NR$^{11}$—(CH$_2$)$_k$—, —CH$_2$CH(OR$^{12}$)—CH$_2$—, —(CH$_2$)$_k$—SO$_2$—, or —O—(CO)—NR$^{11}$—(CH$_2$)$_k$—. Group R$^{11}$ is hydrogen, alkyl, or aryl. Group R$^{12}$ is hydrogen or alkyl. The variable k is an integer in a range of 1 to 20.

Embodiment 21C is the curable composition of any one of embodiments 18C to 20C, wherein the monomer of Formula (X) is of Formula (X-1)

Rf-(CH$_2$)$_k$—O—(CO)—CR$^1$═CH$_2$          (X-1)

wherein Rf is a fluorinated alkyl, R$^1$ is hydrogen or methyl, and k is an integer in a range of 1 to 20.

Embodiment 22C is the curable composition of any one of embodiments 18C to 20C, wherein the monomer of Formula (X) is of Formula (X-2)

Rf-SO$_2$—NR$^{12}$—(CH$_2$)$_k$—O—(CO)—CR$^1$═CH$_2$          (X-2)

wherein Rf is a fluorinated alkyl, R$^1$ is hydrogen or methyl, R$^{12}$ is hydrogen, alkyl, or aryl, and k is an integer in a range of 1 to 20.

Embodiment 23C is the curable composition of any one of embodiments 1C to 22C, wherein the composite particle comprises at least 20 weight percent porous polymeric core particle, at least 0.1 weight percent curing agent and/or curing catalyst, and at least 10 weight percent coating layer based on a total weight of the composite particle.

Embodiment 24C is the curable composition of embodiment 23C, wherein the composite particle comprises 20 to 90 weight percent porous polymeric core particle, 1 to 70 weight percent curing agent and/or curing catalyst, and 10 to 80 weight percent coating layer.

Embodiment 25C is the curable composition of any one of embodiments 1C to 24C, wherein the thickness of the coating layer is in a range of 0.1 to 5 micrometers.

Embodiment 1D is a cured composition that is a reaction product (i.e., polymerized product) of any one of the curable compositions of embodiments 1C to 25C.

Embodiment 1E is an article comprising a first substrate, a second substrate, and a cured composition positioned between the first substrate and the second substrate (i.e., the cured composition is adhered to both the first substrate and the second substrate). The cured composition is a reaction product (i.e., polymerized product) of any one of the curable compositions of embodiments 1C to 25C.

Embodiment 1F is a method of forming a cured composition. The method includes providing a curable composition any one of the embodiments 1C to 25C, heating the curable composition to release the curing agent and/or curing catalyst from the composite particle, and curing the epoxy resin.

EXAMPLES

Unless otherwise noted, all chemicals used in the examples can be obtained from the noted suppliers.

TABLE 1

List of materials and suppliers

| Material | Description |
| --- | --- |
| SR 339 | Trade designation for 2-phenoxyethyl acrylate ester obtained from Sartomer Company, Inc. (Exton, PA, USA) |
| SR 6030P | Trade designation for polyethylene glycol 400 dimethacrylate with a weight average molecular weight of 400 g/mol obtained from Sartomer Company, Inc. (Exton, PA, USA) |
| PPG 4000 | Polypropylene glycol having a weight average molecular weight of 4000 Daltons obtained from Alfa Aesar (Ward Hill, MA, USA) |
| IRGACURE 819 | Trade designation for the photoinitiator bis(2,4,6-trimethylbenzoyl)-phenylphosphineooxide obtained from BASF (Florham Park, NJ, USA) |
| APG 325 N | Nonionic alkyl polyglucoside surfactant obtained from Cognis Corporation, Cincinnati, OH |
| IPA | Isopropyl alcohol obtained from Sigma Aldrich (St. Louis, MO, USA) |
| 2-Sulfoethyl Methacrylate | Scientific Polymer, Inc. (Ontario, New York, USA) |
| 12DMZ | 1,2-dimethylimidazole obtained from Shikoku Chemicals Corp. (Kagawa, Japan) |
| 1B2MZ | Substituted imidazole comprised of 1-Benzyl 2-methyl imidazole that was obtained from Air Products and Chemicals, Inc. (Allentown, PA, USA) |
| $SbF_5$-DEG | Antimony pentafluoride complex with diethylene glycol, synthesized according to Example 1 in U.S. Pat. No. 4,503,161 (Korbel et al.) |
| LEECURE B614 | Boron trifluoride complex with amine, Leepoxy Plastics, Inc. (Fort Wayne, IN) |
| LEECURE B610 | Boron trifluoride complex with amine, Leepoxy Plastics, Inc. (Fort Wayne, IN) |
| NOVEC 7100 | Trade designation for methoxy-nonafluorobutane ($C_4F_9OCH_3$) engineered fluid that is commercially available from 3M Company (Saint Paul, MN, USA). |
| NOVEC 7200 | Trade designation for ethoxy-nonafluorobutane ($C_4F_9OCH_2CH_3$) engineered fluid that is commercially available from 3M Company (Saint Paul, MN, USA). |
| EPON 828 | Epoxy resin comprising the diglycidylether of bisphenol A obtained from Hexion, Inc. (Columbus, OH, USA) |

Test Methods

Differential Scanning Calorimetry

Differential scanning calorimetry (DSC) was performed on a TA Instruments Inc. (New Castle, Del.) Q2000 model. DSC samples were typically 6 to 20 milligrams. Testing was done in sealed, aluminum, T-zero sample pans, at a rate of 10° C./min from room temperature (25° C.) to 300° C. The data from the reaction process was graphed on a chart showing heat flow versus temperature. The integrated area under an exothermic peak represents the total exotherm energy produced during the reaction and is measured in Joules/gram (J/g); the exotherm energy is proportional to extent of cure (that is, degree of polymerization). The exotherm profile (that is, the onset temperature (the temperature at which reaction will begin to occur), the peak temperature, and the end temperature) provides information on conditions needed to cure the sample.

Shelf-life Test

Curable samples were placed at room temperature under ambient conditions. The viscosity of the compositions were monitored until the mixture could not be stirred by hand.

Cure Time Test

Curable samples (10 grams) were placed at oven at a selected temperature (which is noted when results are reported below). Cure time is the amount of time required for a liquid adhesive to reach maximum viscosity or modulus.

Overlap Shear Strength (OLS)

Overlap shear strength of each adhesive film formulation was measured by bonding 25 mm×100 mm×1.6 mm steel coupons into test specimens as described in ASTM 1002-01. The steel coupons used for measuring shear strength were cold-rolled steel (obtained from Q-Lab Corp., Westlake, Ohio, USA under the trade designation "Q-PANEL, RS-14"). The steel coupons were prepared by wiping them with acetone and allowing them to air-dry for five minutes. The adhesives were applied and the two steel coupons were mated together (total thickness of the adhesive film was approximately 250 micrometers by using 10 mil (about 254 micrometers or 0.010 inches) glass beads as spacers, then clamped in place using disposable binder clips. Upon curing, the clips were removed. Overlap shear specimens were clamped into the jaws of a tensile tester (INSTRON, MODEL 5581 equipped with a 10,000 pounds (about 4536 kilograms) load cell) and pulled apart to bond failure at a crosshead speed of 12.5 millimeters (mm) per minute. Results were reported in megapascals (MPa).

Preparatory Example 1

Synthesis of Porous Polymeric Core Particles

The monomers SR 339 (50 grams), SR 6030P (50 grams) and sulfoethyl methacrylate (5 grams) were mixed with PPG 4000 (43 grams) and IRGACURE 819 (0.25 grams). The mixture was stirred vigorously for 20 minutes on gentle heat of about 40° C. to 50° C. This mixture was then added to 300 grams of glycerol previously mixed with the surfactant APG 325 N (15 grams). The mixture was shear mixed for 20 minutes. The mixture was then spread thin between two sheets of polyethylene terephthalate (PET) and cured with ultraviolet light for 10 to 15 minutes with a 100 Watt, long-wavelength BLACK RAY UV lamp (obtained from UVP, LLC of Upland, Calif. USA) situated at about 15 centimeters (6 inches) from the surface of the curing material.

The cured mixture was then dispersed in excess water (500 mL), shaken for 30 minutes, and centrifuged at 3000 rpm in an EPPENDORF 5810 R centrifuge (obtained from Eppendorf in Germany). The supernatant was removed and the resulting particles were then re-suspended in 500 mL of water for a second rinse followed by centrifugation. After this, the particles were suspended in a 500 mL isopropyl alcohol and shaken for 20 minutes. This extracted the PPG 4000 and left voids (i.e., pores or free volume) in the particles. The particles were then centrifuged at 300 revolutions per minute (rpm) for 30 minutes and the supernatant was discarded. The particles were oven-dried overnight at 70° C. to eliminate any isopropyl alcohol left in the mixture.

FIG. 1A and FIG. 1B are scanning electron micrographs at different magnification of the porous polymeric core particles formed.

Preparatory Example 2

Preparation of Heptafluorobutyl Methacrylate ("FBMA"; Prepared According to the Procedure Described for Fluorocopolymer 1 in WO 2002/016517 (Savu et al.))

FBMA was prepared as follows. In a 3 liter flask equipped with overhead stirrer, thermocouple and addition funnel were placed 1260 g of heptafluorobutanol, 20 g of 95% sulfuric acid, 1.2 g of phenothiazine and 1 g of 4-methoxyphenol (MEHQ). The reaction mixture was heated to 55° C., and then the addition of 946 g of methacrylic anhydride was begun. The reaction mixture exothermed to 65° C., so the addition rate was adjusted to keep the reaction mixture temperature at 65° C. The addition of methacrylic anhydride was completed in 2.5 hours. The reaction mixture was heated at 65° C. for an additional 3 hours, then was allowed to cool to room temperature 1200 mL of deionized water was added and the resulting reaction mixture was stirred for 30 minutes. The mixture was allowed to phase-split, and the translucent amethyst-colored fluorochemical lower phase was saved. The lower phase was then stirred for 30 minutes with a mixture of 416 g of sodium carbonate, 50 g of sodium hydroxide and 1500 g of water. Again, the mixture was allowed to phase-split, and the lower fluorochemical phase was saved and washed twice with 1500 g aliquots of water to give 1531 g of crude FBMA. The crude methacrylate was added to a 3 liter flask fitted with a distillation head and a thermocouple. More polymerization inhibitors (3 g of phenothiazine and 0.7 g of MEHQ) were added to the distillation flask. The acrylate was distilled to give 138 g of precut distilling at 176 torr at a head temperature of 61-79° C. The precut was then distilled at 79-85° C. and 161 torr (21.5 kPa) to give a total of 1274 g of purified FBMA.

Preparatory Example 3

Preparation of Poly(FBMA)

Poly(FMBA) was prepared from FBMA according to the process described for preparation of Fluorocopolymer 1 in WO 2002/016517 (Savu et al), with the exception that acrylic acid was not included. The polymer had a number average molecular weight of 50,000 Daltons and a weight average molecular weight of 70,000 Dalton.

Preparatory Example 4

Preparation of Poly(FBMA/acrylic acid) (98:2) ("Poly(FBMA/AA)")

Poly(FMBA/AA) was prepared according to the process described for preparation of Fluorocopolymer 1 in WO 2002/016517 (Savu et al.), except that the ratio of FBMA to acrylic acid was 98:2. The weight average molecular weight is about 28,000 Da and the number average molecular weight is about 17,000 Da. The poly(FBMA/AA) was used as a 17.8 weight percent solids solution in NOVEC 7100.

Preparatory Example 5

Preparation of N-methylperfluorobutanesulfonamidoethyl methacrylate ("MeFBSEMA")

MeFBSEMA was made analogously to the preparation of the preparation of the acrylate analog MeFBSEA in Example 2.B of U.S. Pat. No. 6,664,354 (Savu et al.).

Preparatory Example 6

Preparation of poly(MeFBSEA)

Poly(MeFBSEMA) was prepared analogously to the preparation of Fluorocopolymer 1 in WO 2002/016517 (Savu et al.), with the exception that acrylic acid was not included. The polymer had a number average molecular weight of 30,000 Daltons and a weight average molecular weight of 45,000 Daltons.

Examples 1-5

Preparation of Composite Particles

Example 1 (EX-1)

50 grams of the porous polymeric core particles of Preparatory Example 1 were mixed with 25 grams of 1,2-dimethylimidazole (12DMZ) at 40° C. under ambient environmental conditions for five minutes. The mixture was then cooled down to room temperature. All of the 12DMZ was sorbed by the porous polymeric core particles.

Next, the 12DMZ filled porous polymeric core particles were added to the solution of 100 grams of poly(FBMA) in 600 grams of NOVEC 7100 solvent. The suspension was further mixed with an ultrasonic probe. This suspension (i.e, slurry) was spray dried with a customized MODEL 48 mixed flow spray dryer fabricated by Spray Drying Systems, Inc. (headquartered in Eldersburg, Md.).

The spray dryer was 4 feet (1.2 meters) in diameter and had 8 foot (2.4 meters) straight sides. The spray dryer was operated in closed loop mode (the system was purged with nitrogen, which was then recycled during operation as the bulk drying gas). During operation this bulk drying gas was heated via an electric heater and carried through the drying chamber (entered through the top and exited through the bottom) and finally to a cyclone and a baghouse before passing through the blower (a 1 horse power dryer obtained from AirTech Inc. of Englewood, N.J.) and the condenser (to condense out the solvent) before returning to the heater for reuse. The cyclone separated the product solids from the gas stream; the solids collected in the baghouse were discarded. The bulk drying gas temperature at the drying chamber inlet was 67° C. to 69° C. while the outlet of the drying chamber was 49° C. The slurry was provided at approximately 45 grams per minute via a pneumatic peristaltic pump, using a single MASTERFLEX (Vernon Hills, Ill.) 96420-16 platinum-cured silicone tubing line. The slurry was atomized vertically upward utilizing internally mixed two-fluid pressure spray atomizing nozzles (available from Spraying Systems Co. (Wheaton, Ill.) under the trade designations "FLUID CAP 60100" and "AIR CAP 170"). The atomizing gas was nitrogen, provided at 12 psi (0.08 MPa) and 3.5 (±0.05) standard cubic feet per minute (approximately 99.1 standard liters per minute).

The resulting composite particles (capsules) contained a calculated 14 weight percent 12DMZ catalyst and a calculated 1.63 micrometer fluoropolymer (poly(FBMA)) shell around the porous polymeric core particles.

Example 2 (EX-2)

50 grams of the porous polymeric core particles of Preparatory Example 1 were mixed with 25 grams of 1-Benzyl 2-methyl imidazole (1B2MZ) at room temperature under ambient environmental conditions. All of the 1B2MZ was sorbed by the porous polymeric core particles within five minutes.

Next, the 1B2MZ loaded porous polymeric core particles were mixed with 375 grams of poly(FBMA)/AA solution of Preparatory Example 4 (having 17.8 weight percent solids) and with 200 grams of NOVEC 7200 solvent. The suspension was further mixed with an ultrasonic probe. The resulting slurry was spray dried as in Example 1 except as follows: (1) the chamber inlet temperature was 66° C., (2) the outlet temperature was 48° C., (3) the slurry was provided at 48 (±7) grams per minute, and (4) the atomizing nitrogen was provided at 10 psi (0.07 MPa) and 3.40 (±0.05) standard cubic feet per minute (approximately 96.3 standard liters per minute).

The resulting composite particles (capsules) contained a calculated 17 weight percent 1B2MZ catalyst and a calculated 1.26 micrometer fluoropolymer (fluorinated poly(acrylate)) shell around the porous polymeric core particles.

Example 3 (EX-3)

50 grams of the porous polymeric core particles of Preparatory Example 1 were mixed with 25 grams of $SbF_5$-DEG at 40° C. under ambient environmental conditions for five minutes. The mixture was then cooled down to room temperature. All of the $SbF_5$-DEG was sorbed by the porous polymeric core particles.

Next, the $SbF_5$-DEG loaded porous polymeric core particles were mixed with 375 grams of poly(FBMA)/AA solution of Preparatory Example 4 (having 17.8 weight percent solids) and with 200 grams of NOVEC 7200 solvent. The suspension was further mixed with an ultrasonic probe. The resulting slurry was spray dried as in Example 1 except as follows: (1) the chamber inlet temperature was 71° C.-73° C., (1) the outlet temperature was 47° C., (3) the slurry was provided at approximately 55 grams per minute, and (4) the atomizing nitrogen was provided at 10.5 psi (0.07 MPa) and 3.55 (±0.05) standard cubic feet per minute (approximately 100.5 standard liters per minute).

Figure 2:
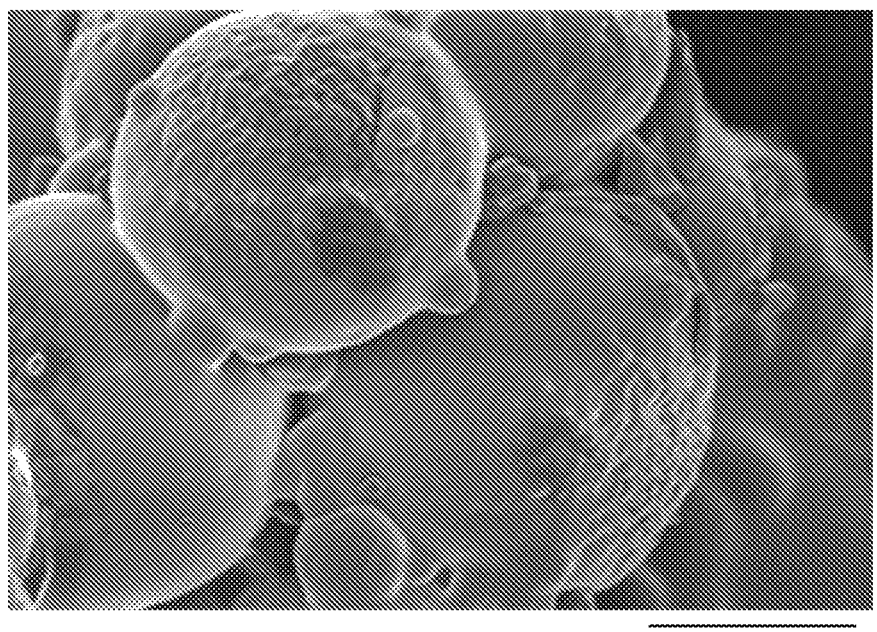
FIG. 2 is the SEM image of example composite particles that were prepared according to Example 3.

The resulting composite particles (capsules) contained a calculated 17 weight percent SbF5-DEG catalyst and a calculated 1.26 micrometer fluoropolymer (fluorinated poly (acrylate)) shell around the porous polymeric core particles. FIG. 2 is a scanning electron micrograph of the composite particles formed.

Example 4 (EX-4)

50 grams of the porous polymeric core particles of Preparatory Example 1 were mixed with 25 grams of $SbF_5$-DEG at 40° C. under ambient environmental conditions for five minutes. The mixture was then cooled down to room temperature. All of the $SbF_5$-DEG was sorbed by the porous polymeric core particles.

Next, the $SbF_5$-DEG loaded porous polymeric core particles were mixed with 750 grams of the poly(FBMA)/AA solution of Preparatory Example 4 (having 17.8 weight percent solids) and with 300 grams of NOVEC 7100 solvent. The suspension was further mixed with an ultrasonic probe. The resulting slurry was spray dried as in Example 1 except as follows: (1) the chamber inlet temperature was 59° C-61° C., (2) the outlet temperature was 43° C., (3) the slurry was provided at 55 grams per minute, and (4) the atomizing nitrogen was provided at 10 psi (0.07 MPa) and 3.40 (±0.05) standard cubic feet per minute (approximately 96.3 standard liters per minute).

Figure 3A:
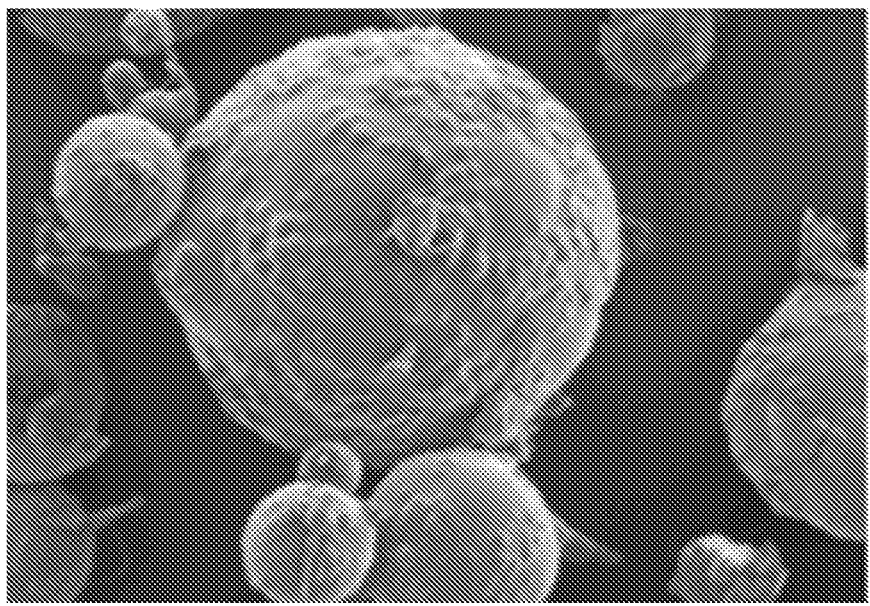
FIGS. 3A and 3B are SEM images of example composite particles that were prepared according to Example 4. These two SEM images have different magnifications.
Figure 3B:
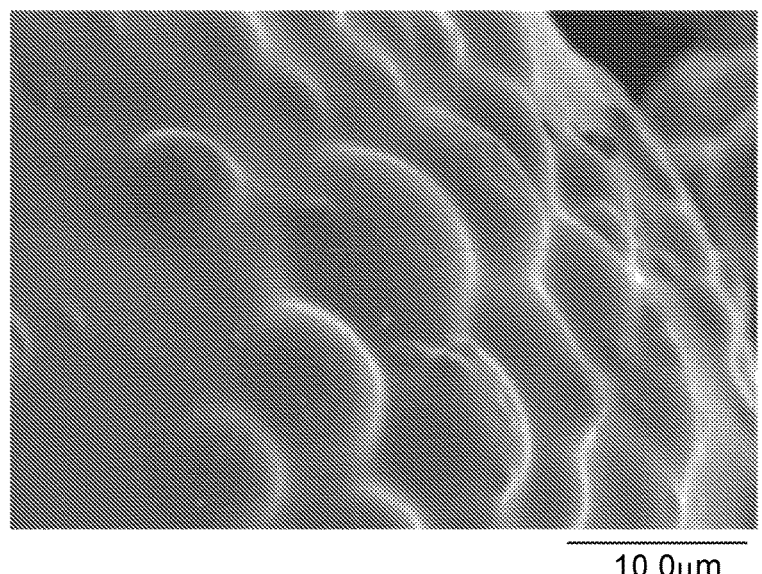

The resulting composite particles (capsules) contained a calculated 11 weight percent SbF5-DEG catalyst and a calculated 2.3 micrometer fluoropolymer shell around the porous polymeric core particles. FIG. 3 is a scanning electron micrograph for the composite particles that formed.

Example 5 (EX-5)

50 grams of the porous polymeric core particles of Preparatory Example 1 were mixed with 25 grams of LEECURE B614 at 40° C. under ambient environmental conditions for five minutes. The mixture was then cooled down to room temperature. All of the LEECURE B614 was sorbed by the porous polymeric core particles.

Next, the LEECURE B614 loaded porous polymeric core particles were added to the solution of 150 grams of poly (MeFBSEMA) in 900 grams of NOVEC 7200 solvent. The suspension was further mixed with an ultrasonic probe. The resulting slurry was spray dried as in Example 1 except as follows: (1) the chamber inlet was 62° C-64° C., (2) the outlet temperature was 46° C., (3) the slurry was provided at 23 (±3) grams per minute, and (4) the atomizing nitrogen was provided at 13 psi (0.09 MPa) and 3.95 (±0.05) standard cubic feet per minute (approximately 111.9 standard liters per minute).

The resulting composite particles (capsules) contained a calculated 11 weight percent LEECURE B614 catalyst and a calculated 2.3 micrometer fluoropolymer shell.

Example 6 (EX-6)

50 grams of the porous polymeric core particles of Preparatory Example 1 were mixed with 25 grams of LEECURE B614 at 40° C. under ambient environmental conditions for five minutes. The mixture was then cooled down to room temperature. All of the LEECURE B610 was sorbed by the porous polymeric core particles.

Next, the LEECURE B610 loaded porous polymeric core particles were added to the solution of 150 grams of poly (MeFBSEMA) in 900 grams of NOVEC 7100 solvent. The suspension was further mixed with an ultrasonic probe. The resulting slurry was spray dried as in Example 1 except as follows: (1) the chamber inlet temperature was 60° C-62° C., (2) the outlet temperature was 44° C-45° C., (3) the slurry was provided at 32 grams per minute, and (4) the atomizing nitrogen was provided at 12 psi (0.08 MPa) and 3.6 (±0.05) standard cubic feet per minute (approximately 101.9 standard liters per minute).

The resulting composite particles (capsules) contained a calculated 11 weight percent LEECURE B610 catalyst and a calculated 2.3 micrometer fluoropolymer shell.

Examples 7-12

One-Part Heat-Curable Compositions Containing Composite Particles

Example 7 (EX-7)

A one-part heat-curable composition was prepared by placing 8.6 grams of EPON 828 and 1.4 grams of Example 1, which contained 14 weight percent encapsulated 12DMZ catalyst. The amount of catalyst used was 2 weight percent based on the entire curable composition. The sample was mixed with a DAC mixer (SpeedMixer DAC 150.1 FV from Flacktek, Inc.) at 1000 RPM for 1 minute. Then, a sample was weighed into a Differential Scanning calorimetry (DSC) pan for analysis. Table 2 contains the onset temperature and peak temperature from the DSC scan, which was obtained as described above, Table 2 also includes cure time data (using the cure time test described above at 130° C.) and the shelf-life at 25° C. (using the shelf life test described above).

Example 8 (EX-8)

A one-part heat-curable composition was prepared by placing 8.8 grams of EPON 828 and 1.2 grams of Example 2, which contained 17 weight percent encapsulated 1B2MZ catalyst. The amount of catalyst used was 2 weight percent based on the entire curable composition. Table 2 contains the onset temperature and peak temperature from the DSC scan, which was obtained as described above. Table 2 also includes cure time data (using the cure time test described above at 100° C.) and the shelf-life at 25° C. (using the shelf life test described above).

Example 9 (EX-9)

Figure 4:
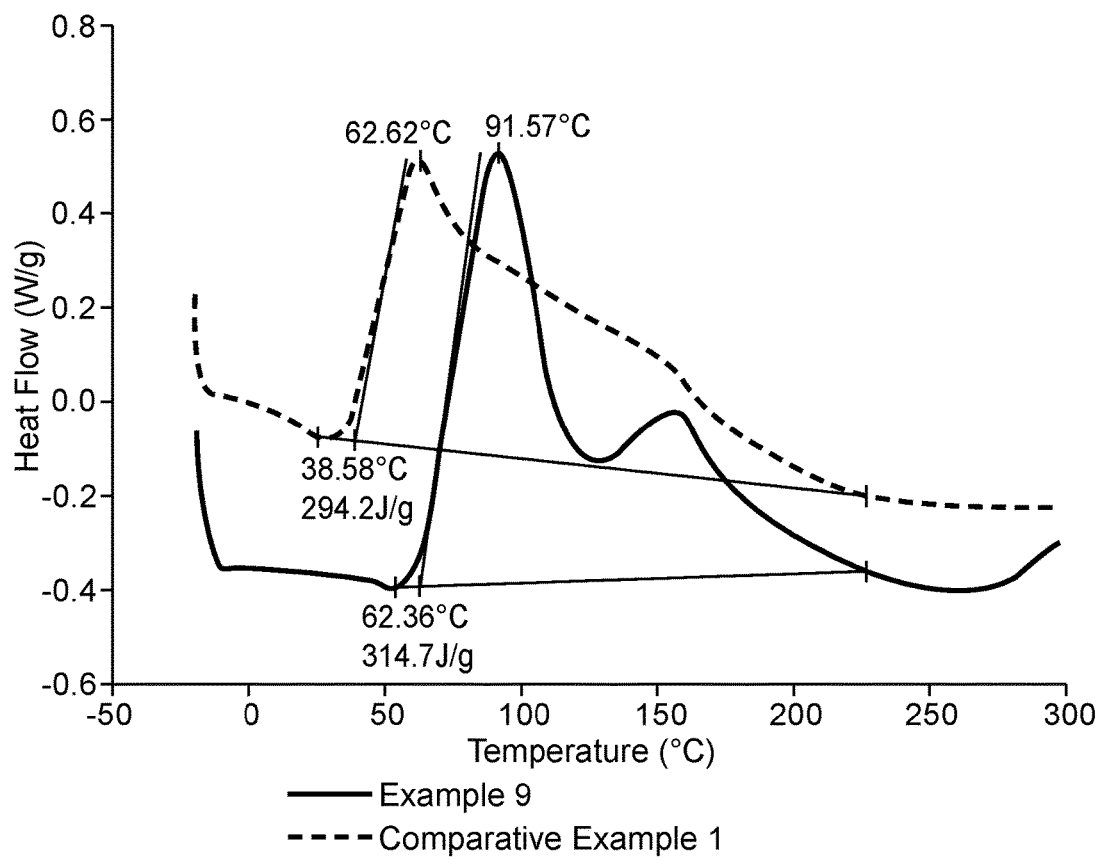
FIG. 4 shows the Differential Scanning calorimetry (DSC) plots of heat flow versus temperature for Example 9 and Comparative Example 1.

A one-part heat-curable composition was prepared by placing 8.8 grams of EPON 828 and 1.2 grams of Example 3, which contained 17 weight percent encapsulated 17% SbF5-DEG catalyst. The amount of catalyst used was 2 weight percent based on the entire curable composition. Table 2 contains the onset temperature and peak temperature from the DSC scan, which was obtained as described above, Table 2 also includes cure time data (using the cure time test described above at 80° C.) and the shelf-life at 25° C. (using the shelf life test described above). The DSC scan for Example 9 was compared to that of Comparative Example 1 in FIG. 4.

Example 10 (EX-10)

A one-part heat-curable composition was prepared by placing 8.2 grams of EPON 828 and 1.8 grams of Example 4, which contained 11 weight percent encapsulated SbF5-DEG catalyst. The amount of catalyst used was 2 weight percent based on the entire curable composition. Table 2 contains the onset temperature and peak temperature from the DSC scan, which was obtained as described above, Table 2 also includes cure time data (using the cure time test described above at 100° C.) and the shelf-life at 25° C. (using the shelf life test described above). The overlap shear of Example 10 is compared to that of Comparative Example 1 in Table 3.

Example 11 (EX-11)

A one-part heat-curable composition was prepared by placing 73 parts EPON 828 and 27 parts of Example 5, which contained 11 weight percent encapsulated LEECURE B614 catalyst. The amount of catalyst used was 2 weight percent based on the entire curable composition. Table 2 contains the onset temperature and peak temperature from the DSC scan, which was obtained as described above, Table 2 also includes cure time data (using the cure time test described above at 120° C.) and the shelf-life at 25° C. (using the shelf life test described above).

Example 12 (EX-12)

A one-part heat-curable composition was prepared by placing 73 parts EPON 828 and 27 parts of Example 6, which contained 11 weight percent encapsulated LEECURE B610 catalyst. The amount of catalyst used was 2 weight percent based on the entire curable composition. Table 2 contains the onset temperature and peak temperature from the DSC scan, which was obtained as described above, Table 2 also includes cure time data (using the cure time test described above at 120° C.) and the shelf-life at 25° C. (using the shelf life test described above).

Comparative Examples 1-3

Comparative Example 1 (CE-1)

A comparative example (CE-1) was prepared by mixing 98 parts by weight EPON 828 with 2 parts SbF5-DEG catalyst (the catalyst was not encapsulated). Table 2 contains the onset temperature and peak temperature from the DSC scan, which was obtained as described above, Table 2 also includes cure time data (using the cure time test described above at 50° C.) and the shelf-life at 25° C. (using the shelf life test described above). The overlap shear of Comparative Example 1 is compared to that of Example 10 in Table 3. The DSC scan of Comparative Example 1 was compared to that of Example 9 in FIG. 4.

Comparative Example 2 (CE-2)

A comparative example (CE-2) was prepared by mixing 98 parts by weight EPON 828 with 2 parts LEECURE B614 catalyst (the catalyst was not encapsulated). Table 2 contains the onset temperature and peak temperature from the DSC scan, which was obtained as described above, Table 2 also includes cure time data (using the cure time test described above at 65° C.) and the shelf-life at 25° C. (using the shelf life test described above).

Comparative Example 3 (CE-3)

A comparative example (CE-3) was prepared by mixing 98 parts by weight EPON 828 with 2 parts LEECURE B610 catalyst (the catalyst was not encapsulated). Table 2 contains the onset temperature and peak temperature from the DSC scan, which was obtained as described above, Table 2 also includes cure time data (using the cure time test described above at 65° C.) and the shelf-life at 25° C. (using the shelf life test described above).

TABLE 2

Curing of Examples 7-12 and Comparative Examples 1-3

| Sample | Formulation | DSC Onset temp (°C.) | DSC Peak temp (°C.) | Cure time (min/°C.) | Shelf-life at 25° C. |
|---|---|---|---|---|---|
| EX-7 | 86 parts EPON 828<br>14 parts EX-1<br>(EX-1: 14 wt. % 12DMZ catalyst and 1.63 μm shell) | 100 | 160 | 20/130 | 50 days |
| EX-8 | 88 parts EPON 828<br>12 parts EX-2<br>(EX-2: 17 wt. % 1B2MZ catalyst and 1.26 μm shell) | 93 | 147 | 20/100 | 18 days |
| EX-9 | 88 parts EPON 828<br>12 parts EX-3<br>(EX-3: 17 wt. % $SbF_5$-DEG catalyst and 1.26 μm shell) | 62 | 91 | 30/80 | 4 weeks |
| EX-10 | 82 parts EPON 828<br>18 parts EX-4<br>(EX-4: 11 wt. % $SbF_5$-DEG catalyst and 2.3 μm shell) | 83 | 115 | 30/80 | 3 months |
| EX-11 | 73 parts EPON 828<br>27 parts EX-5<br>(EX5: 11 wt. % LEECURE B614 catalyst and 2.3 μm shell) | 102 | 141 | 30/120 | 1 Month |
| EX-12 | 73 parts EPON 828<br>27 parts EX-6<br>(EX-6: 11 wt. % LEECURE B610 catalyst and 2.3 μm shell) | 95 | 121 | 30/100 | 3 Weeks |
| CE-1 | 98 parts EPON 828<br>2 parts $SbF_5$-DEG catalyst | 38 | 62 | 1/50 | <3 Minutes |
| CE-2 | 98 parts EPON828<br>2 parts LEECURE B614 catalyst | 42 | 66 | 2/65 | 25 Minutes |
| CE-3 | 98 parts EPON828<br>2 parts LEECURE B610 catalyst | 54 | 68 | 3/25 | 3 Minutes |

Overlap shear (OLS) specimens of EX-10 and CE-1 were prepared on cold-rolled steel substrates and cured at 80° C. for 30 minutes. Both EX-10 and CE-1 contained 2 weight percent $SbF_5$-DEG catalyst in the curable composition. Details of the overlap shear test are further described above. The results are shown in Table 3. Compared with the non-encapsulated system, there was no adverse effect on OLS resulted from encapsulation of the catalyst within the composite particle having a fluoropolymer shell. Furthermore, after aging the specimens at 80° C. for 5 and 10 days, there was no reduction on OLS.

TABLE 3

Overlap Shear of EX-10 and CE-1

| | CE-1 freshly cured | EX-10 freshly cured | EX-10 aged at 80° C. for 5 days | EX-10 aged at 80° C. for 10 days |
|---|---|---|---|---|
| OLS (MPa) | 14.2 ± 1.4 | 15.9 ± 1.2 | 17.4 ± 1.5 | 16.2 ± 2.5 |

What is claimed is:

1. A composite particle comprising:
   a) a porous polymeric core particle;
   b) a curing agent and/or a curing catalyst for an epoxy resin positioned within the porous polymeric core particle but not covalently bound to the porous polymeric core particle; and
   c) a coating layer around the porous polymeric core particle, wherein the coating layer comprises a fluorinated polymer comprising a polymerized product of a monomer composition comprising a monomer of Formula (X-2)

$$Rf-SO_2-NR^{12}-(CH_2)_k-O-(CO)-CR^1=CH_2 \quad (X-2)$$

wherein
   Rf is a fluorinated alkyl;
   $R^1$ is hydrogen or methyl;
   $R^{12}$ is hydrogen, alkyl, or aryl; and
   k is an integer in a range of 1 to 20.

2. The composite particle of claim 1, wherein the composite particle comprises a curing catalyst that is a Lewis acid.

3. The composite particle of claim 1, wherein the porous polymeric core particle comprises a crosslinked (meth) acrylate polymeric material.

4. The composite particle of claim 1, wherein the composite particle comprises 20 to 90 weight percent porous polymeric core particle, 1 to 70 weight percent curing agent and/or curing catalyst, and 1 to 80 weight percent coating layer.

5. A curable composition comprising:
   a) an epoxy resin; and
   b) a composite particle mixed with the epoxy resin, wherein the composite particle comprises
      i) a porous polymeric core particle;
      ii) a curing agent and/or curing catalyst for an epoxy resin positioned within the porous polymeric core particle but not covalently bound to the porous polymeric core particle; and
      iii) a coating layer around the porous polymeric core particle, wherein the coating layer comprising a fluorinated polymer comprising a polymerized product of a monomer composition comprising a monomer of Formula (X-2)

$$Rf-SO_2-NR^{12}-(CH_2)_k-O-(CO)-CR^1=CH_2 \quad (X-2)$$

wherein
   Rf is a fluorinated alkyl;
   $R^1$ is hydrogen or methyl;

R$^{12}$ is hydrogen, alkyl, or aryl; and k is an integer in a range of 1 to 20.

6. The curable composition of claim 5, wherein the composite particle comprises a curing catalyst that is a Lewis acid.

7. The curable composition of claim 5, wherein the porous polymeric core particle comprises a crosslinked (meth) acrylate polymeric material.

8. The curable composition of claim 5, wherein the composite particle comprises 20 to 90 weight percent porous polymeric core particle, 1 to 70 weight percent curing agent and/or curing catalyst, and 1 to 80 weight percent coating layer.

9. A cured composition comprising a reaction product of a curable composition comprising:
   a) an epoxy resin; and
   b) a composite particle mixed with the epoxy resin, wherein the composite particle comprises
      i) a porous polymeric core particle;
      ii) a curing agent and/or curing catalyst for an epoxy resin positioned within the porous polymeric core particle but not covalently bound to the porous polymeric core particle; and
      iii) a coating layer around the porous polymeric core particle, wherein the coating layer comprising a fluorinated polymer comprising a polymerized product of a monomer composition comprising a monomer of Formula (X-2)

$$Rf-SO_2-NR^{12}-(CH_2)_k-O-(CO)-CR^1=CH_2 \quad (X\text{-}2)$$

wherein

Rf is a fluorinated alkyl;

R$^1$ is hydrogen or methyl;

R$^{12}$ is hydrogen, alkyl, or aryl; and k is an integer in a range of 1 to 20.

10. The cured composition of claim 9, wherein the curing catalyst is a Lewis acid.

11. The cured composition of claim 9, wherein the composite particle comprises 20 to 90 weight percent porous polymeric core particle, 1 to 70 weight percent curing agent and/or curing catalyst, and 1 to 80 weight percent coating layer.

* * * * *

UNITED STATES PATENT AND TRADEMARK OFFICE
CERTIFICATE OF CORRECTION

PATENT NO. : 10,400,072 B2
APPLICATION NO. : 16/095184
DATED : September 3, 2019
INVENTOR(S) : Ying Lin et al.

Page 1 of 2

It is certified that error appears in the above-identified patent and that said Letters Patent is hereby corrected as shown below:

In the Specification

Column 1
Line 59, Delete "about150°" and insert -- about 150° --, therefor.

Column 5
Line 30, Delete "IV" and insert -- $R^1$ --, therefor.

Column 11
Line 32, Delete "heptadecanyl" and insert -- heptadecanoyl --, therefor.

Column 12
Line 19, Delete "—$R^5$O—" and insert -- —$R^5$—O— --, therefor.

Column 21
Line 6, Delete "isophorene" and insert -- isophorone --, therefor.
Line 7, Delete "-dimainodecane," and insert -- -diaminodecane, --, therefor.
Line 7, Delete "-diaminododecene," and insert -- -diaminododecane, --, therefor.

Column 23
Line 47, Delete "1-napthtylamine." and insert -- 1-naphthylamine. --, therefor.

Column 29
Line 55, Delete "—O)$_2$" and insert -- —O)$_z$ --, therefor.

Column 37
Line 51, Delete "dihydroxydiphenylpropylenphenylmethane," and insert
-- dihydroxydiphenylpropylenephenylmethane, --, therefor.

Signed and Sealed this
Twenty-second Day of October, 2019

Andrei Iancu
*Director of the United States Patent and Trademark Office*

CERTIFICATE OF CORRECTION (continued)
U.S. Pat. No. 10,400,072 B2

Column 38
Line 34, Delete "EPALLLOY" and insert -- EPALLOY --, therefor.
Line 44, Delete "epichlorihydrin" and insert -- epichlorohydrin --, therefor.

Column 43
Line 1, Delete "IV" and insert -- $R^1$ --, therefor.

Column 44
Line 9, Delete "For Embodiment mula" and insert -- Formula --, therefor.
Line 63, Delete "IV" and insert -- $R^1$ --, therefor.

Column 45
Line 7, Delete "IV" and insert -- $R^1$ --, therefor.

Column 46
Line 60, Delete "SC" and insert -- 5C --, therefor.

Column 47
Line 1, Delete "IV" and insert -- $R^1$ --, therefor.

Column 49
Line 12, Delete "phenylphosphineooxide" and insert -- phenylphosphineoxide --, therefor.

Column 55
Line 17, Delete "calorimetry" and insert -- Calorimetry --, therefor.

In the Claims

Column 60
Line 7, In Claim 9, delete "$(CH_2)_k\text{—o—}_{(CO)\text{-}CR}{}^1\text{=}CH_2$" and insert -- $(CH_2)_k\text{—O—}(CO)\text{-}CR^1\text{=}CH_2$ --, therefor.